United States Patent [19]
Kuroda et al.

[11] Patent Number: 5,794,170
[45] Date of Patent: Aug. 11, 1998

[54] DOWNHILL COASTING SITUATION DETECTING DEVICE FOR AUTOMOTIVE VEHICLE

[75] Inventors: Kouichi Kuroda, Yokosuka; Hiroshi Takahashi, Komae, both of Japan

[73] Assignee: Nissan Motor Co., Ltd., Yokohama, Japan

[21] Appl. No.: 557,209

[22] Filed: Nov. 14, 1995

[30] Foreign Application Priority Data

Nov. 14, 1994 [JP] Japan ................... 6-279246
Nov. 14, 1994 [JP] Japan ................... 6-279247

[51] Int. Cl.$^6$ ................................ B60K 31/00
[52] U.S. Cl. .................. 701/93; 701/95; 180/179; 123/350
[58] Field of Search ............... 364/426.041, 426.042, 364/426.043, 426.044, 431.07, 460, 461; 123/350, 352; 180/170, 176, 177, 178, 179; 701/93-96, 110, 300, 301

[56] References Cited

U.S. PATENT DOCUMENTS

| | | | |
|---|---|---|---|
| 4,467,428 | 8/1984 | Caldwell | 364/426.042 |
| 4,922,428 | 5/1990 | Takahashi | 364/426.042 |
| 4,933,859 | 6/1990 | Tsuyama et al. | 364/426.043 |
| 4,982,805 | 1/1991 | Naitou et al. | 180/179 |
| 5,019,986 | 5/1991 | Londt et al. | 364/426.042 |
| 5,155,687 | 10/1992 | Katayama | 364/426.042 |
| 5,392,215 | 2/1995 | Morita | 123/352 |
| 5,557,519 | 9/1996 | Morita | 364/426.041 |
| 5,598,335 | 1/1997 | You | 364/426.043 |

FOREIGN PATENT DOCUMENTS

| | | |
|---|---|---|
| 57-37144 | 3/1982 | Japan . |
| 62-238126 | 10/1987 | Japan . |
| 63-289360 | 11/1988 | Japan . |
| 1-30959 | 2/1989 | Japan . |

*Primary Examiner*—Gary Chin
*Attorney, Agent, or Firm*—Foley & Lardner

[57] ABSTRACT

A downhill coasting situation detecting device for an automotive vehicle comprises a sensor for detecting an opening degree of a throttle valve for an engine of the automotive vehicle, a first derivative calculating device for calculating a first derivative of the vehicle speed, a second derivative calculating device for calculating a second derivative of the vehicle speed, and a downhill coasting situation determining device for determining that the automotive vehicle being in a downhill coasting situation in which the vehicle being coasting on a downhill road in accordance with a condition in which the opening degree of the throttle valve is zero and the first derivative of vehicle speed is positive and besides the second derivative of vehicle speed is nearly equal to zero. With the downhill coasting situation detecting device, the downhill coasting situation can be exactly detected, so that e.g. down-shifting for obtaining further engine braking can be automatically executed in the downhill coasting situation.

10 Claims, 24 Drawing Sheets

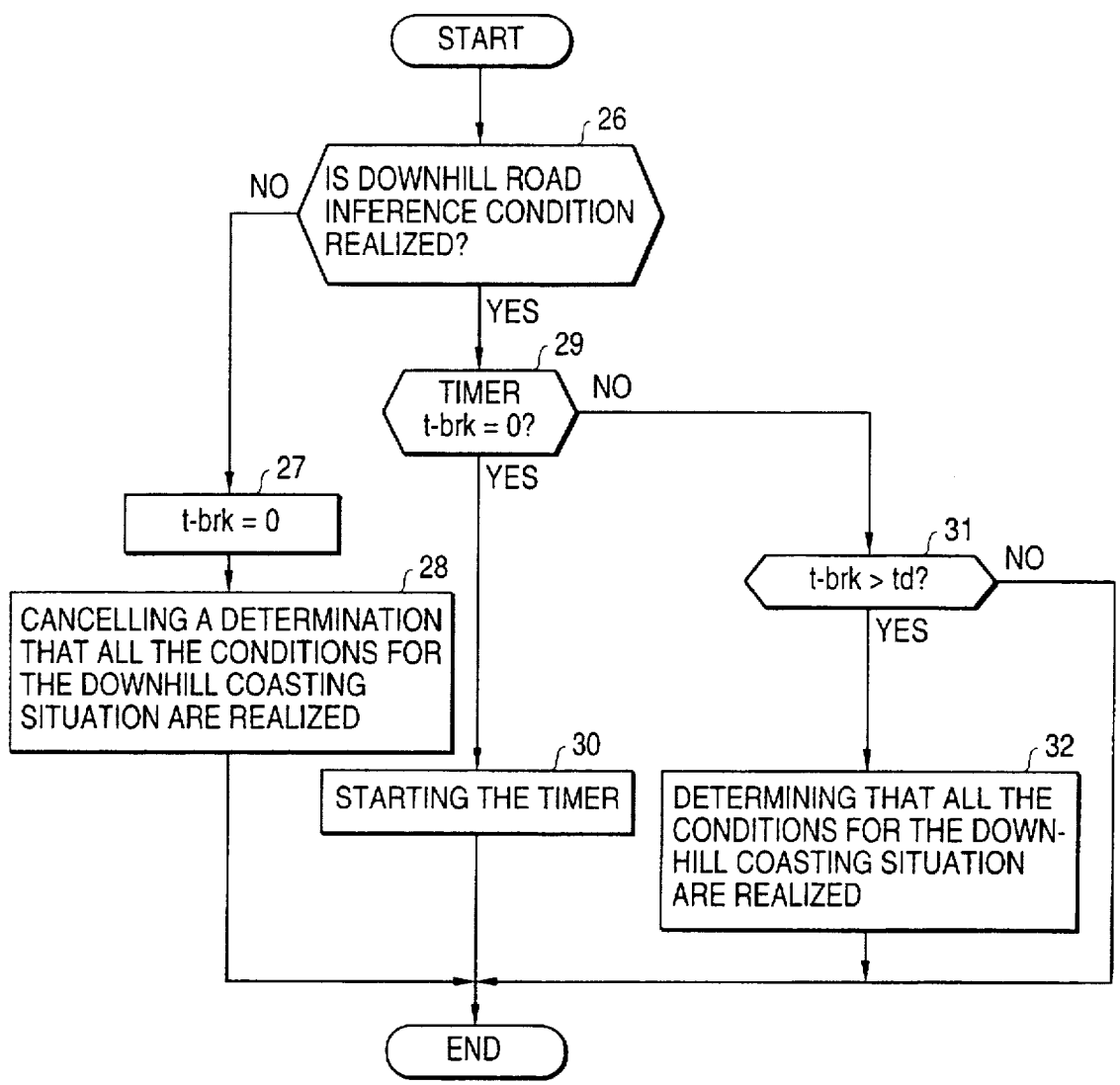

COASTING ON A DOWNHILL ROAD

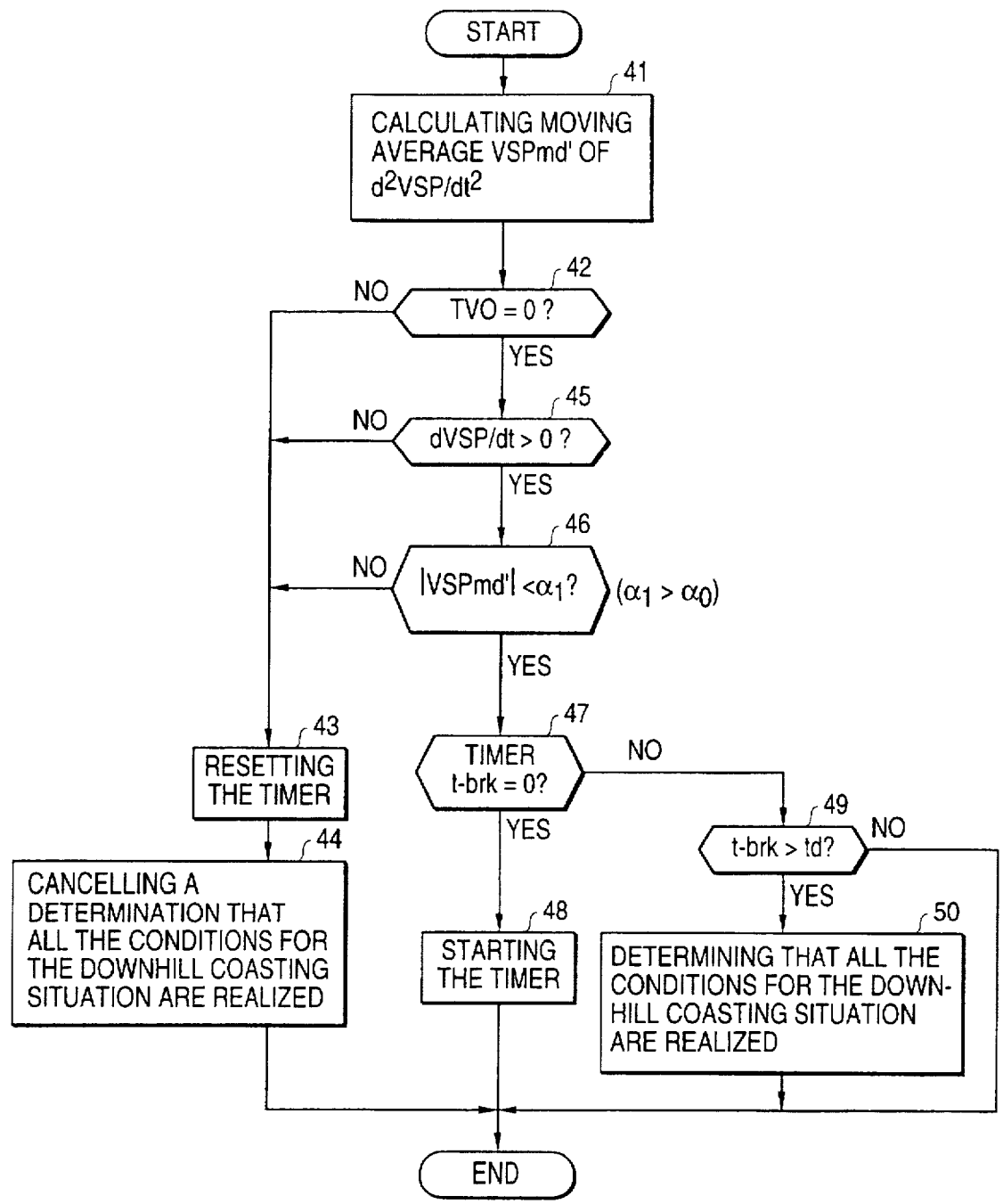

INCLINE CHANGE POINT OF THE DOWNHILL ROAD

COASTING ON A DOWNHILL ROAD WITH AN INCLINE CHANGE

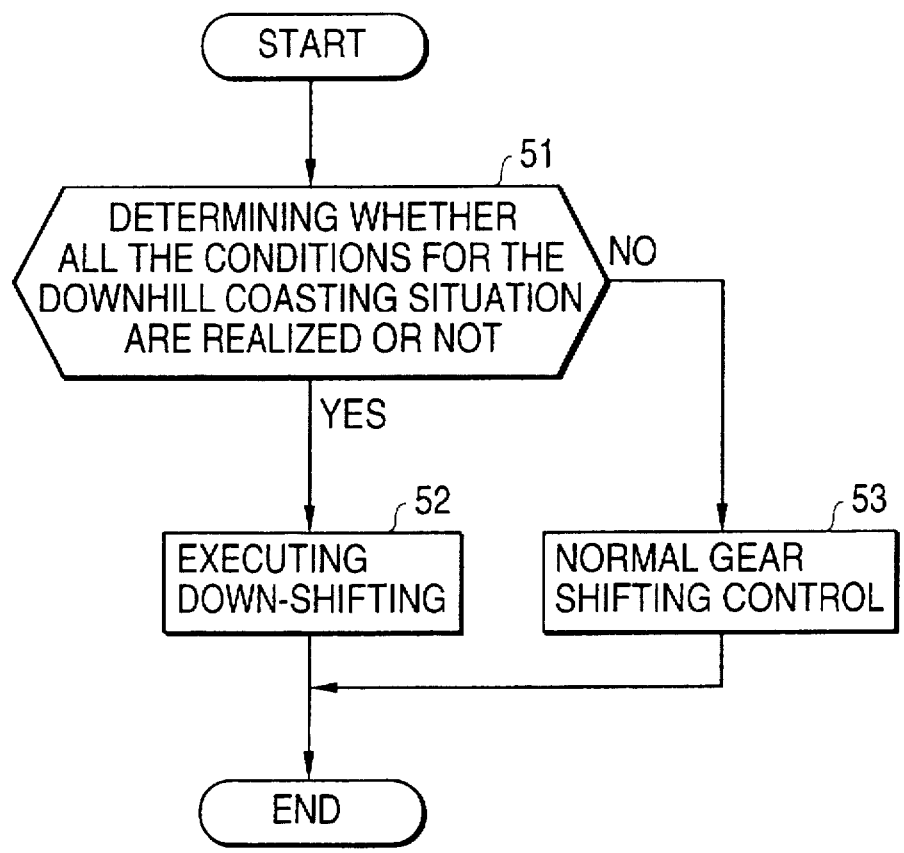

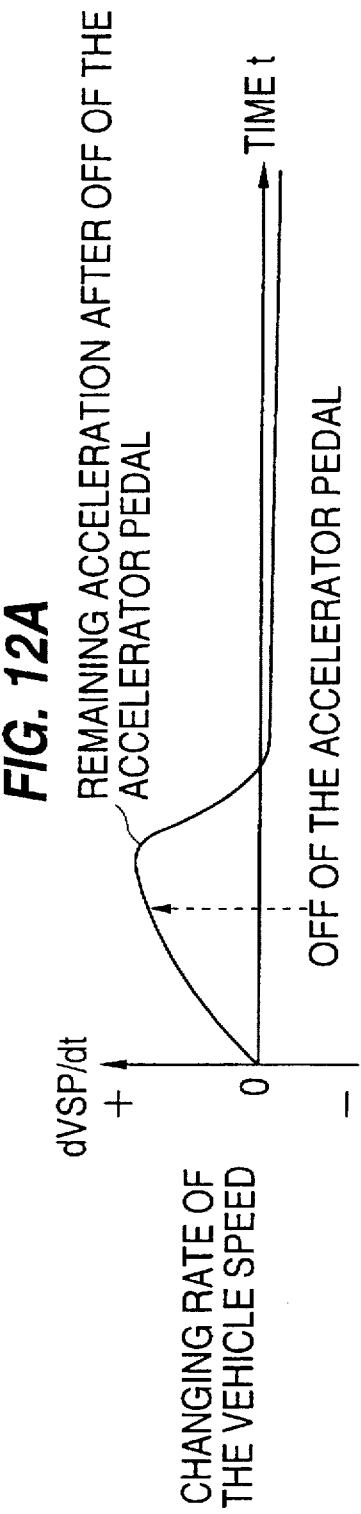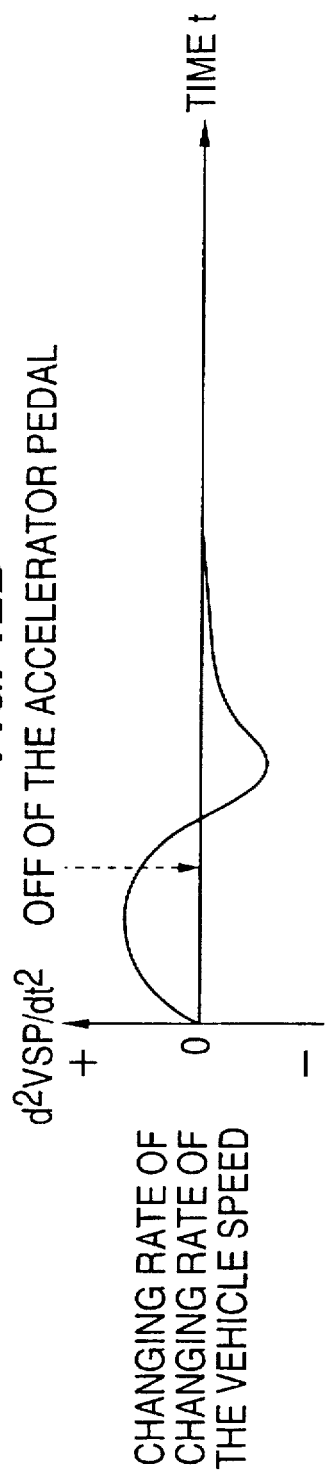

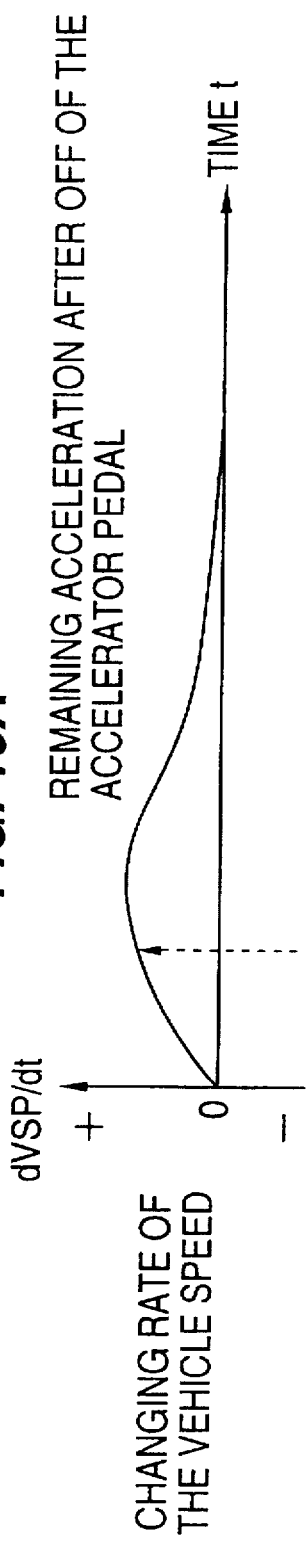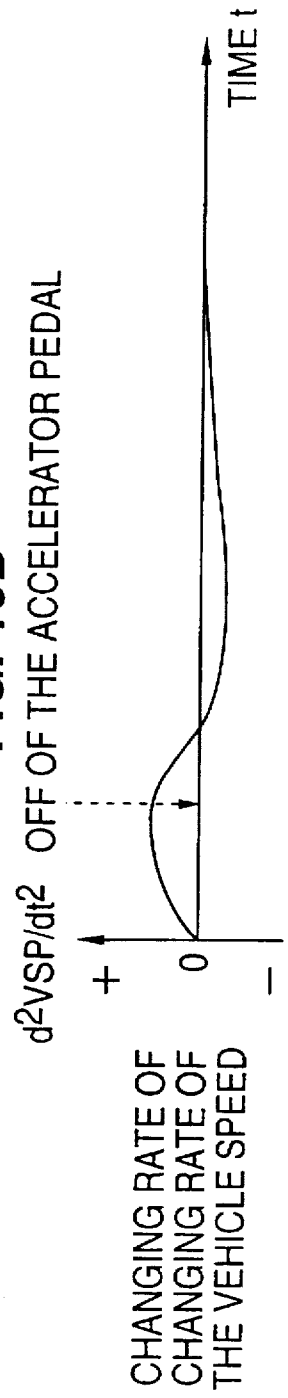

0 — REALIZATION OF DOWNHILL ROAD DETECTING CONDITION
td — DOWN-SHIFTING

DOWNHILL COASTING SITUATION DETECTING DEVICE FOR AUTOMOTIVE VEHICLE

BACKGROUND OF THE INVENTION

1. Field of the Invention

The present invention relates to a downhill coasting situation detecting device for an automotive vehicle, which detects a coasting situation of an automotive vehicle on a downhill road. Further, the present invention relates to control devices for an automotive vehicle which comprise the above-mentioned downhill coasting situation detecting device.

2. Description of the Related Art

A typical automatic transmission for an automotive vehicle selects a gear position by engaging one or more frictional elements (e.g. clutches and/or brakes) selectively, and executes shifting of the gear position (up-shifting or down-shifting) to another gear position by turning some of the engaged conditions of the frictional elements to a released condition. Such gear position shifting is usually controlled based on a shift pattern which is selected as an appropriate shift pattern for a present driving condition among many shift patterns in accordance with many parameters relating to a driving condition of an automotive vehicle which are e.g. a vehicle speed, an opening degree of a throttle valve for an engine and an operating oil temperature of an automatic transmission of the vehicle.

In the meantime, when an automotive vehicle coasts on a downhill road in a situation in which a high gear position (e.g. the over-drive position) is selected, the vehicle is required to shift down the gear position due to insufficiency of an engine braking power.

Therefore, as the above-mentioned downhill coasting situation detecting device for an automotive vehicle, many kinds of devices are known for controlling the automatic transmission in such a downhill coasting situation. For example, in a device described in a Japanese patent application laid-open No. 62-238126, a determination is made whether the vehicle is in the downhill coasting situation or not, based on a changing rate of a vehicle speed in a fully closed condition of a throttle valve for an engine of the vehicle (i.e. an OFF condition of an accelerator pedal), on the other hand, in other devices described in Japanese patent applications laid-open No. 63-289360 and 64-30959, a determination is made whether the vehicle is in the downhill coasting situation or not, based on a detection of an inclination of a running road by an incline sensor.

Further, in another device described in a Japanese patent application laid-open No. 57-37144, a determination is made whether the vehicle is in the downhill coasting situation or not, based on a matter that a product of a propeller shaft rotating speed and a gear ratio becomes greater than an engine speed when engine braking is effected to an automotive vehicle with a torque converter on a downhill road.

However, in the device described in a Japanese patent application laid-open No. 62-238126, the determination whether the vehicle is in the downhill coasting situation or not, is made in accordance with a determining standard that the vehicle is in the downhill coasting situation if a vehicle speed is increased by a predetermined value in a fully closed condition of a throttle valve for an engine of the vehicle, based on a changing rate of a vehicle speed in the fully closed condition of the throttle valve, therefore a detection error that the vehicle being in the downhill coasting situation despite the vehicle being on a flat road, may be caused.

Because, as shown in FIG. 12, in case of that the throttle valve is fully closed (the accelerator pedal is released and made OFF) after a rapid acceleration on a flat road, the engine speed is not rapidly reduced after a point of time of fully closing of the throttle valve, due to a delay of air and fuel sucking of the engine, further, the acceleration remains after the point of time of fully closing of the throttle valve due to an inertia of the vehicle by the rapid acceleration. Further, as shown in FIG. 13, in case of that the accelerator pedal is released after depressing thereof to accelerate the vehicle by a driver intending to achieve a little increase of a vehicle speed on a slightly inclined downhill road, a detection error that the vehicle being in the downhill coasting situation despite the vehicle being on a flat road, may also be caused, because the acceleration may remain after the point of time of fully closing of the throttle valve caused by the accelerator pedal being made OFF.

On the other hand, in the devices described in the Japanese patent application laid-open No. 63-289360 and 64-30959, the vehicle is required to add the incline sensor newly, causing an increase of a production cost of the vehicle.

Further, in the device described in the Japanese patent application laid-open No. 57-37144, the determination whether the vehicle is in the downhill coasting situation or not, cannot be made when engine braking is not effected to the automotive vehicle.

Meanwhile, in an automotive vehicle described in the Japanese patent application laid-open No. 64-30959, an automatic transmission of the vehicle selects a shift map corresponding to a shift pattern, in accordance with a determination of the downhill coasting situation executed by the above-mentioned device and an inclination detected thereby, and the automatic transmission controls a gear position based on the selected shift map. With such a gear position control, the automatic transmission can execute a down-shifting in accordance with an inclination, without manual shifting of the gear position by a driver.

However, in such an automatic transmission, since the shifting control is executed uniformly by changing the shift map, a delay from a point of time of the accelerator pedal being made OFF to a point of time of down-shifting, becomes constant, so that there is a problem that a timing of the down-shifting does not always correspond to a requirement of the driver for the down-shifting.

Further, in such an automatic transmission, in case of that an uphill road follows a short downhill road immediately, unnecessary down-shifting may be executed.

SUMMARY OF THE INVENTION

It is therefore an object of the present invention to provide an improved downhill coasting situation detecting device for an automotive vehicle, which is capable of overcoming the aforementioned problems of the known devices. A further object of the present invention to provide improved control devices for an automotive vehicle which utilize the improved downhill coasting situation detecting device.

To this end, a downhill coasting situation detecting device for an automotive vehicle in accordance with a first aspect of the present invention comprises, as shown in FIG. 1, a throttle valve opening degree detecting means for detecting an opening degree of a throttle valve for an engine of the automotive vehicle, a vehicle speed changing rate calculating means for calculating a changing rate of a vehicle speed of the automotive vehicle, a vehicle speed changing rate changing rate calculating means for calculating a changing rate of a changing rate of a vehicle speed of the automotive vehicle, and a downhill coasting situation determining means for determining that the automotive vehicle being in a downhill coasting situation in which the vehicle being coasting on a downhill road in accordance with a condition in which the opening degree of the throttle valve is zero and the changing rate of the vehicle speed is positive and besides the changing rate of the changing rate of the vehicle speed is nearly equal to zero, based on the detected opening degree of the throttle valve, the calculated changing rate of the vehicle speed and the calculated changing rate of the changing rate of the vehicle speed.

With the downhill coasting situation detecting device of the first aspect of the present invention, based on an opening degree of the throttle valve detected by the throttle valve opening degree detecting means, a changing rate of the vehicle speed calculated by the vehicle speed changing rate calculating means, and a changing rate of the changing rate of the vehicle speed calculated by the vehicle speed changing rate changing rate calculating means, the downhill coasting situation determining means determines that the automotive vehicle is in a downhill coasting situation in which the vehicle being coasting on a downhill road, in case of that the opening degree of the throttle valve is zero and the changing rate of the vehicle speed is positive and besides the changing rate of the changing rate of the vehicle speed is nearly equal to zero.

In the meantime, on a downhill road, even if a driver does not operate the accelerator pedal, an automotive vehicle is accelerated by a gravity and coasts, so that a vehicle speed is increased by a certain rate despite the opening degree of the throttle valve being zero, therefore in such a situation, a changing rate of the vehicle speed becomes positive while a changing rate of the changing rate of the vehicle speed becomes nearly equal to zero for a certain time. Thus, the downhill coasting situation is detected by the device in accordance with the present invention, based on the opening degree of the throttle valve, the changing rate of the vehicle speed and the changing rate of the changing rate of the vehicle speed. Accordingly, a detection error caused by a remaining acceleration after a rapid acceleration of the vehicle, can be prevented. Further, despite whether engine braking being effected or not, and with no requirement of adding of an incline sensor, the device in accordance with the present invention can detect the downhill coasting situation. Further, since it is well known that a nerve system of human feels a coasting condition by the changing rate of the changing rate of the vehicle speed, the device in accordance with the present invention can detect the downhill coasting situation, corresponding to the human feeling.

In a downhill coasting situation detecting device for an automotive vehicle in accordance with a second aspect of the present invention, the downhill coasting situation determining means determines that the automotive vehicle being in a downhill coasting situation in accordance with a condition in which a moving average of the calculated changing rate of the changing rate of the vehicle speed being nearly equal to zero.

With the downhill coasting situation detecting device of the second aspect of the present invention, even if the changing rate of the changing rate of the vehicle speed is changed suddenly due to changing of an inclination on the way of the downhill road, the downhill coasting situation can be detected because the device utilizes the moving average of the calculated changing rate of the changing rate of the vehicle speed for a certain time.

A control device for an automotive vehicle in accordance with a third aspect of the present invention comprises the downhill coasting situation detecting device for an automotive vehicle in accordance with the first or second aspect of the present invention, and changes a shift pattern of an automatic transmission of the vehicle based on a detection of the downhill coasting situation by the downhill coasting situation detecting device.

With the control device in accordance with the third aspect of the present invention, a shift pattern of the automatic transmission is changed based on a detection of the downhill coasting situation by the downhill coasting situation detecting device, so that an appropriate shift pattern can be selected for the downhill coasting situation.

A control device for an automotive vehicle in accordance with a fourth aspect of the present invention comprises, as shown in FIG. 2, the downhill coasting situation detecting device for an automotive vehicle in accordance with the first aspect of the present invention, and further comprises a delay calculating means for calculating an aiming delay from a point of time of an opening degree of the throttle valve being made zero to a point of time of down-shifting based on an inclination of a downhill road thereof in case of the downhill coasting situation being detected by the downhill coasting situation detecting device, and a down-shifting directing means for directing an automatic transmission of the vehicle to execute down-shifting, in case of the downhill coasting situation still being detected by the downhill coasting situation detecting device after passing of the calculated aiming delay.

With the control device in accordance with the fourth aspect of the present invention, when the downhill coasting situation detecting device detects the downhill coasting situation in which the vehicle is coasting on a downhill road, the delay calculating means calculates an aiming delay from a point of time of an opening degree of the throttle valve being made zero to a point of time of down-shifting based on an inclination of the downhill road which may be determined from a changing rate of a vehicle speed instead of a signal from an incline sensor, then the down-shifting directing means directs an automatic transmission of the vehicle to execute down-shifting in case of the downhill coasting situation still being detected by the downhill coasting situation detecting device after passing of the calculated aiming delay.

Thus, after passing of the appropriate aiming delay from a point of time of an opening degree of the throttle valve being made zero to a point of time of down-shifting calculated by the delay calculating means based on an inclination of the downhill road, down-shifting is executed by the automatic transmission obeying the direction from the down-shifting directing means, so that down-shifting is appropriately executed on a downhill road, corresponding to a requirement of a driver of the vehicle, and unnecessary down-shifting can be prevented.

A control device for an automotive vehicle in accordance with a fifth aspect of the present invention further comprises a delay calculation repeating means for directing the delay calculating means to repeat the calculation of the aiming delay responding to changing of an inclination of the downhill road from a point of time of an opening degree of the throttle valve being made zero to a point of time of downshifting.

With the control device in accordance with the fifth aspect of the present invention, the aiming delay can be calculated more exactly, so that down-shifting can be executed with better correspondence to an intention of a driver of the vehicle.

A control device for an automotive vehicle in accordance with a sixth aspect of the present invention further comprises a delay correcting means for correcting the aiming delay calculated by the delay calculating means, in accordance with the vehicle speed.

With the control device in accordance with the sixth aspect of the present invention, the aiming delay calculated by the delay calculating means is corrected by the delay correcting means in accordance with the vehicle speed, so that down-shifting can be executed with better correspondence to an intention of a driver of the vehicle.

A control device for an automotive vehicle in accordance with a seventh aspect of the present invention further comprises a down-shifted gear position releasing means for releasing an enforcement of the downshifted gear position caused by the down-shifting directing means, in case of the throttle valve being opened by a driver of the vehicle on the downhill road.

With the control device in accordance with the seventh aspect of the present invention, when the throttle valve is opened by a driver of the vehicle on the downhill road, the down-shifted gear position releasing means releases the an enforcement of the down-shifted gear position caused by the down-shifting directing means, so that engine braking can be released, and the vehicle can be accelerate to a high vehicle speed desired by the driver.

A control device for an automotive vehicle in accordance with an eighth aspect of the present invention further comprises a frictional resistance determining means for determining a frictional resistance of the downhill road, and a down-shifting inhibiting means for inhibiting an execution of down-shifting of the automatic transmission directed by the down-shifting directing means, in case of the determined frictional resistance being lower than a predetermined value.

With the control device in accordance with the eighth aspect of the present invention, the frictional resistance determining means determines a frictional resistance of the downhill road, and when a frictional resistance determined by the frictional resistance determining means is lower than a predetermined value, the down-shifting inhibiting means inhibits an execution of down-shifting of the automatic transmission directed by the down-shifting directing means, so that spinning of the vehicle caused by down-shifting can be prevented.

A control device for an automotive vehicle in accordance with a ninth aspect of the present invention comprises the downhill coasting situation detecting device for an automotive vehicle in accordance with the first or second aspect of the present invention, and changes an ignition timing of an ignitor for an engine of the vehicle based on a detection of the downhill coasting situation by the downhill coasting situation detecting device.

With the control device in accordance with the ninth aspect of the present invention, an ignition timing of the ignitor is changed based on a detection of the downhill coasting situation by the downhill coasting situation detecting device, so that the engine can be ignited at an appropriate timing for the downhill coasting situation.

A control device for an automotive vehicle in accordance with a tenth aspect of the present invention comprises the downhill coasting situation detecting device for an automotive vehicle in accordance with the first or second aspect of the present invention, and changes an amount of fuel supplied by a fuel supplier for an engine of the vehicle based on a detection of the downhill coasting situation by the downhill coasting situation detecting device.

With the control device in accordance with the tenth aspect of the present invention, an amount of fuel supplied by the fuel supplier is changed based on a detection of the downhill coasting situation by the downhill coasting situation detecting device, so that the engine can be supplied with an appropriate amount of fuel for the downhill coasting situation.

BRIEF DESCRIPTION OF THE DRAWINGS

The present invention will now be explained in more detail with reference to preferred embodiments shown in the attached drawings, in which:

FIG. 5 shows a flow-chart of a control routine program also carried out by the downhill coasting situation determining device in the first example shown in FIG. 3;

FIG. 7 shows a flow-chart of a control routine program carried out by a downhill coasting situation determining device in a second example of the downhill coasting situation detecting device as the first preferred embodiment in accordance with the present invention;

FIG. 9 shows a flow-chart of a control routine program carried out by a first example of a control device for an automotive vehicle as a second preferred embodiment in accordance with the present invention;

FIG. 12 shows graphs exhibiting examples of transitions of a first derivative dVSP/dt of a vehicle speed and a second derivative $d^2VSP/dt^2$ of a vehicle speed, in such a condition that a throttle valve is fully closed immediately after a rapid acceleration on a flat road;

FIG. 13 shows graphs exhibiting other examples of transitions of a first derivative dVSP/dt of a vehicle speed and a second derivative $d^2VSP/dt^2$ of a vehicle speed, in such a condition that a driver increases a vehicle speed with an intention to accelerate the vehicle;

DETAILED EXPLANATION OF THE PREFERRED EMBODIMENTS

Figure 1:
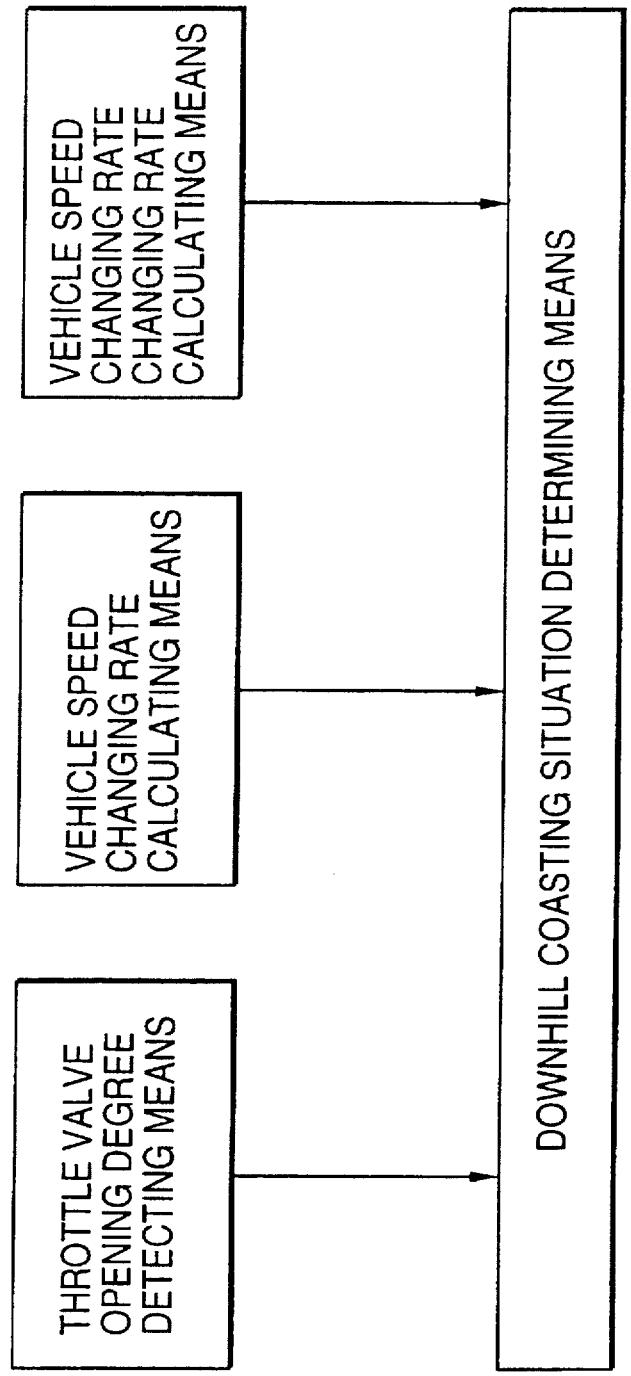
FIG. 1 shows a block diagram of a basic arrangement of a downhill coasting situation detecting device for an automotive vehicle in accordance with the present invention.
Figure 2:
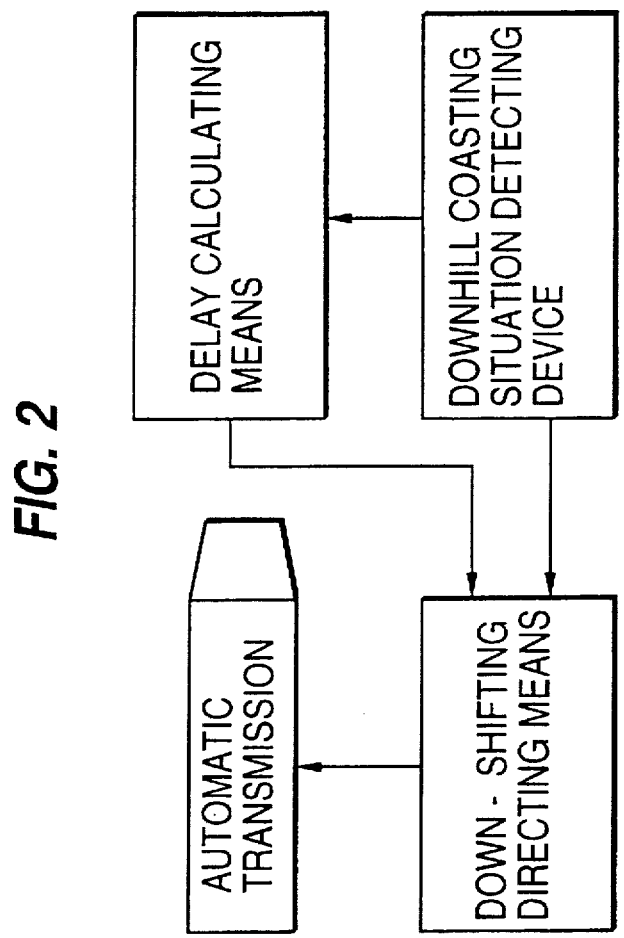
FIG. 2 shows a block diagram of a basic arrangement of a control device for an automotive vehicle in accordance with the present invention.
Figure 3:
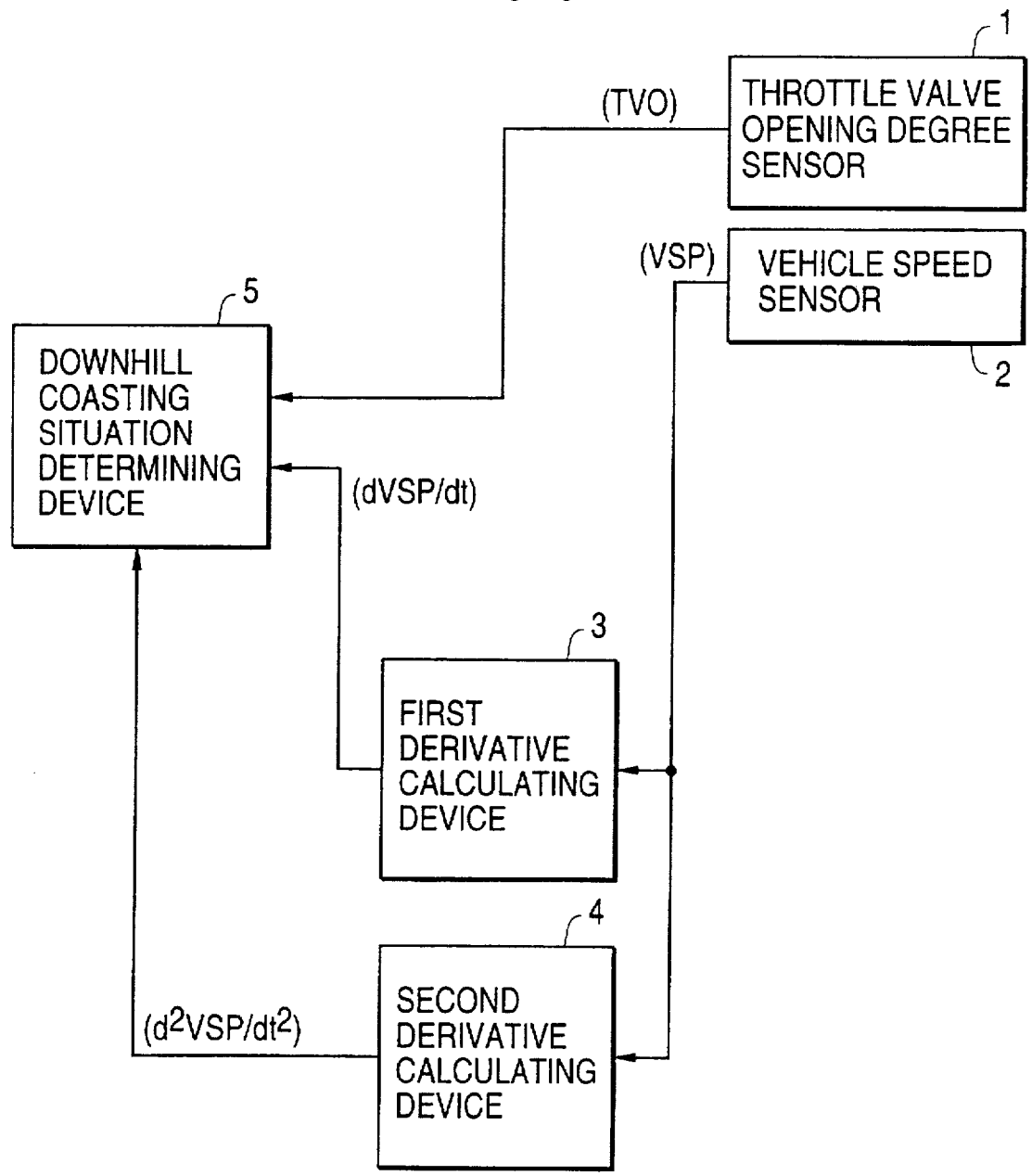
FIG. 3 shows a block diagram of an arrangement of a first example of a downhill coasting situation detecting device as a first preferred embodiment in accordance with the present invention.

FIG. 3 shows a first example of a downhill coasting situation detecting device for an automotive vehicle as a first preferred embodiment in accordance with the present invention. The downhill coasting situation detecting device shown in FIG. 3 comprises a throttle valve opening degree sensor 1 as the throttle valve opening degree detecting means for detecting an opening degree TVO of a throttle valve for an engine (not shown) of the automotive vehicle (not shown), a vehicle speed sensor 2 for detecting a vehicle speed VSP of the automotive vehicle, a first derivative calculating device 3 as the vehicle speed changing rate calculating means for calculating a changing rate dVSP/dt of a vehicle speed of the automotive vehicle i.e. the first derivative of a vehicle speed VSP with respect to time t based on a vehicle speed VSP detected by the vehicle speed sensor 2, and a second derivative calculating device 4 as the vehicle speed changing rate changing rate calculating means for calculating a changing rate $d^2VSP/dt^2$ of a changing rate of a vehicle speed of the automotive vehicle i.e. the second derivative of a vehicle speed VSP with respect to time t based on a vehicle speed VSP detected by the vehicle speed sensor 2.

The downhill coasting situation detecting device shown in FIG. 3 further comprises a downhill coasting situation determining device 5 as the downhill coasting situation determining means for determining whether the automotive vehicle being in a downhill coasting situation in which the vehicle being coasting on a downhill road, or not, based on the detected opening degree TVO of the throttle valve, the first derivative dVSP/dt of the vehicle speed and the second derivative $d^2VSP/dt^2$ of the vehicle speed, which are brought from the throttle valve opening degree sensor 1, the first derivative calculating device 3 and the second derivative calculating device 4.

In this example, the above-mentioned devices 3, 4 and 5 are composed of digital circuits, and the first derivative calculating device 3 calculates the first derivative from the detected vehicle speed VSP at intervals of a certain time, while the second derivative calculating device 4 calculates the second derivative from the detected vehicle speed VSP at intervals of a certain time.

Figure 4:
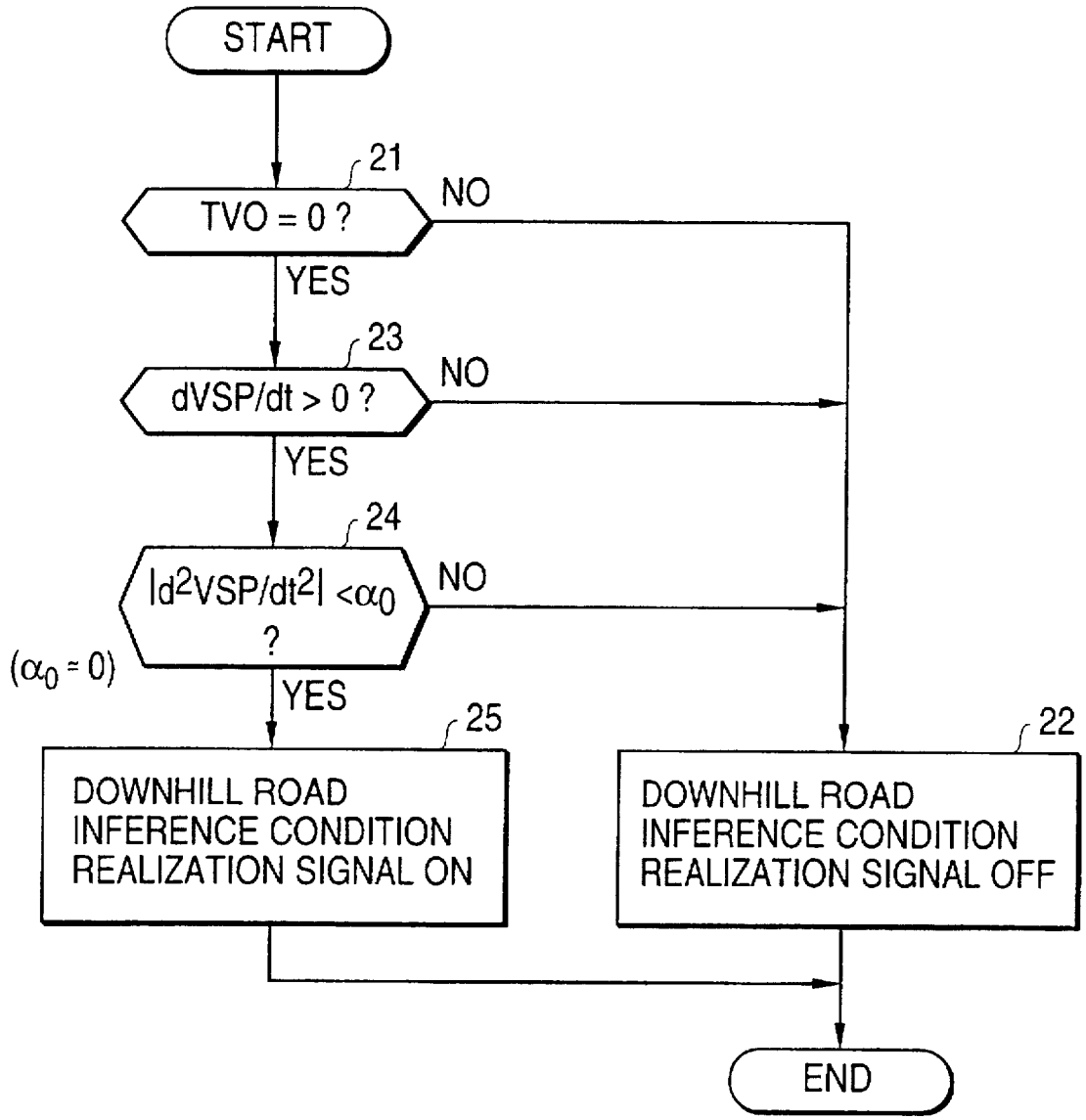
FIG. 4 shows a flow-chart of a control routine program carried out by a downhill coasting situation determining device in the first example shown in FIG. 3.

FIG. 4 shows a flow-chart of a control routine program for generating a downhill road inference condition realization signal for indicating realization of the below-mentioned downhill road inference conditions to infer that the vehicle is coasting on a downhill road. This control routine program is carried out by the downhill coasting situation determining device 5 repeatedly during running of the vehicle. In this program, at step 21, a determination is made whether the opening degree TVO of the throttle valve detected by the sensor 1 is zero (TVO=0) or not, i.e. a driver of the vehicle is stepping on an accelerator pedal of the vehicle or not. When a determination that the opening degree TVO of the throttle valve is not zero, is made at the step 21, the procedure is shifted to step 22, and the downhill road inference condition realization signal is made OFF at the step 22, then the procedure ends.

On the other hand, when a determination is made as the opening degree TVO of the throttle valve being zero at the step 21, the procedure is shifted to step 23, and a determination is made whether the first derivative dVSP/dt of the vehicle speed calculated by the first derivative calculating device 3 is positive or not, i.e. the vehicle speed VSP is increased or not at the step 23. When a determination that the first derivative dVSP/dt of the vehicle speed is not positive, is made at the step 23, the procedure is shifted to the step 22, and the downhill road inference condition realization signal is made OFF at the step 22 despite TVO=0, then the procedure ends. When a determination that the first derivative dVSP/dt of the vehicle speed is positive, is made at the step 23, i.e. when TVO=0 and besides dVSP/dt>0, the procedure is shifted to step 24.

At the step 24, a determination is further made whether an absolute value of the second derivative $d^2VSP/dt^2$ of the vehicle speed calculated by the second derivative calculating device 4 is smaller than a predetermined value $\alpha_0$ or not, in which the value $\alpha_0$ has been determined as a value nearly equal to zero i.e. $\alpha_0 \approx 0$ (provided that the value $\alpha_0$ is positive). When a determination that the absolute value of the second derivative $d^2VSP/dt^2$ of the vehicle speed is smaller than the predetermined value $\alpha_0$, is made at the step 24, the procedure is shifted to step 25, and at the step 25, the downhill road inference condition realization signal is made ON i.e. the signal is generated, then the procedure ends. On the other hand, when a determination that the absolute value of the second derivative $d^2VSP/dt^2$ of the vehicle speed is equal to or larger than the predetermined value $\alpha_0$, is made at the step 24, the procedure is shifted to the step 22, and the downhill road inference condition realization signal is made OFF at the step 22 despite TVO=0 and dVSP/dt>0, then the procedure ends.

That is, in this example, (1);TVO=0, (2);dVSP/dt>0 and (3); $|d^2VSP/dt^2|< \alpha_0$ are set as the downhill road inference conditions, because when a vehicle is coasting on a downhill road, the vehicle speed is increased by a certain rate (dVSP/dt>0 and $d^2VSP/dt^2=0$) even if the throttle valve is fully closed (TVO=0). Therefore, at the steps 21 and 23 in the control routine program shown in FIG. 4, the determination is made whether a vehicle speed is increased by a certain rate despite the throttle valve being fully closed, or not, so as to determine whether the vehicle is in the downhill coasting situation or not, and further not only the first derivative of the vehicle speed (i.e. a changing rate of the vehicle speed, or in other words an acceleration of the vehicle), but also at the step 24, the second derivative of the vehicle speed (i.e. a changing rate of a changing rate of the vehicle speed, or in other words a changing rate of the acceleration of the vehicle) is determined so as to prevent a detection error due to a remaining inertia of the vehicle after rapid accelerating thereof, etc.

It is to be noted that, as known from a transition of dVSP/dt shown at the upper part of FIG. 12, when the throttle valve is fully closed (the accelerator pedal is made OFF by releasing thereof) immediately after a rapid acceleration on a flat road, a situation in which TVO=0 and dVSP/dt>0 appears for a certain time despite the vehicle being not on a downhill road. Further, as known from a transition of dVSP/dt shown at the upper part of FIG. 13, when a driver increases a vehicle speed with an intention to accelerate the vehicle, i.e. when a driver executes an operation to accelerate the vehicle, the situation in which TVO=0 and dVSP/dt>0 also appears for a certain time, despite the driver having no intention to coast the vehicle.

Therefore, if a detection of the downhill coasting situation is executed depending on only the conditions TVO=0 and dVSP/dt>0, i.e. depending on only a situation in which a vehicle speed is increasing despite a fully closed condition of the throttle valve, a detection error may be caused in the cases as shown in FIG. 12 and FIG. 13. However, in these cases, a transition of the second derivative $d^2VSP/dt^2$ of the vehicle speed takes on characteristics as shown at the lower part of FIG. 12, 13, in which the second derivative $d^2VSP/dt^2$ does not stay in a range nearly equal to zero.

Thus, with this example introducing a determination with respect to the second derivative $d^2VSP/dt^2$ of the vehicle speed, the downhill coasting situation can be distinguished from the confusing cases as shown in FIG. 12, 13, so that a detection error that the vehicle being in the downhill coasting situation despite the vehicle being in the cases as shown in FIG. 12, 13, can be prevented.

Incidentally, in the transition of $d^2VSP/dt^2$ shown at the lower parts of FIG. 12, 13, during turning from positive to negative, the second derivative $d^2VSP/dt^2$ crosses over the zero line instantaneously. With respect to this point, when a determination whether the above-mentioned mentioned downhill road inference conditions (1), (2) and (3) are realized for a certain time or not, is included, the detection procedure is enough to detect the downhill coasting situation.

FIG. 5 shows a flow-chart of a control routine program for determining whether the vehicle being in the downhill road coasting situation or not, considering the above-mentioned point. This control routine program is also carried out by the downhill coasting situation determining device 5 repeatedly during running of the vehicle. In this program, at step 26, a determination is made whether the downhill road inference condition realization signal is made ON (i.e. the signal is generated) or not, based on watching of the result of the above-mentioned control routine program shown in FIG. 4. When the downhill road inference condition realization signal is not made ON, the procedure is shifted to step 27, and a value t-brk of a timer in the downhill coasting situation determining device 5 is reset as 0 (i.e. t-brk=0) at the step 27, and a determination that all the conditions for the downhill road coasting situation are realized, is canceled at next step 28, then the procedure ends.

On the other hand, when a determination that the downhill road inference condition realization signal is made ON, is made at the step 26, the procedure is shifted to step 29, and a determination is made whether the value t-brk of the timer is zero or not (i.e. the timer has been started or not) at the step 29. When the timer value t-brk is zero since the current procedure is the first time procedure after the determination that the downhill road inference condition realization signal is made ON, has been made at the step 26, the procedure is shifted to step 30, and at the step 30, the timer is started to keep time, then the procedure ends.

When a determination that the timer value t-brk is not zero, is made at the step 29 since the procedure is shifted from the step 26 to the step 29 after the timer has been started, the procedure is further shifted from the step 29 to step 31, and a determination is made whether the timer value t-brk is greater than a predetermined value td or not at the step 31, this comparison of the timer value t-brk with the predetermined value td corresponding to a determination whether the downhill road inference condition is realized continuously for a certain time td (e.g. td=0.5 sec.) or not. It is to be noted that the predetermined value td can be understood as a delay.

When a determination that the timer value t-brk is not greater than the predetermined value td, is made at the step 31, a determination that all the conditions for the downhill road coasting situation are realized, is not made, then the procedure ends. During the determination that the timer value t-brk is not greater than the predetermined value td, is repeated, if the determination that the downhill road inference condition realization signal is not made ON, is made at the step 26 as mentioned above, then the timer is reset at the time at the step 27 despite the timer value t-brk does not reach to the predetermined value td. On the other hand, when a determination that the timer value t-brk is greater than the predetermined value td, is made at the step 31, a determination that all the conditions for the downhill road coasting situation are realized, is made at next step 32, and the downhill coasting situation determining device 5 generates a signal indicating that the vehicle is in the downhill road coasting situation, then the procedure ends.

Figure 6A:
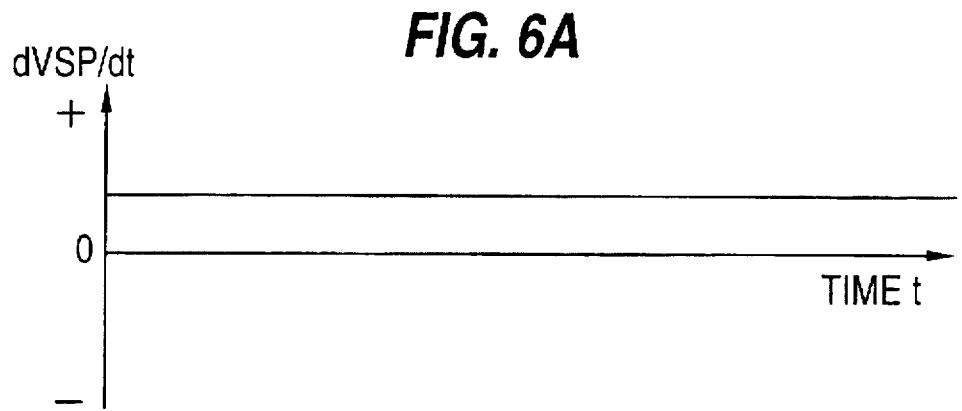
FIG. 6 shows graphs exhibiting examples of transitions of first derivative dVSP/dt of vehicle speed and second derivative $d^2VSP/dt^2$ of vehicle speed, in such a condition that the vehicle is coasting on a downhill road.
Figure 6B:
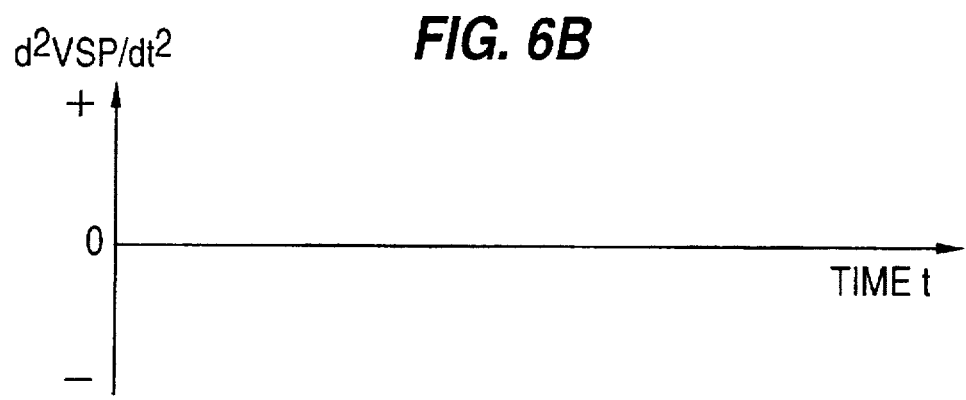

With this example, a determination whether the vehicle is in the downhill road coasting situation or not, is made based on the opening degree TVO of the throttle valve, the first derivative dVSP/dt of the vehicle speed and the second derivative $d^2VSP/dt^2$ of the vehicle speed, then in case of the first derivative dVSP/dt and the second derivative $d^2VSP/dt^2$ of the vehicle speed being substantially in a relation as shown in FIG. 6, a determination that the vehicle is in the downhill road coasting situation, is made. Therefore, in the device of this example, there is no problem of the detection error due to a remaining acceleration after rapid accelerating of the vehicle etc., and besides, the device of this example can detect the downhill road coasting situation correctly despite whether engine braking is effected or not, and without an additional sensor such as the incline sensor.

It is to be noted that if the device of this example is constituted from analog circuits, the first derivative calculating device 3 may be changed to a first derivative differentiator, and the second derivative calculating device 4 may be changed to a second derivative differentiator.

Next, a second example of a downhill coasting situation detecting device for an automotive vehicle of the first preferred embodiment in accordance with the present invention is explained. The downhill coasting situation detecting device of this example also comprises a throttle valve opening degree sensor 1, a vehicle speed sensor 2, a first derivative calculating device 3, a second derivative calculating device 4, and a downhill coasting situation determining device 5, which are similar to those of the above-mentioned first example, so that the same references are used for corresponding sensors and devices.

FIG. 7 shows a flow-chart of a control routine program for determining whether the vehicle being in the downhill road coasting situation or not, which is carried out by the downhill coasting situation determining device 5 of the second example. This control routine program is also carried out by the device 5 repeatedly during running of the vehicle.

In this program, at step 41, a moving average VSPma" for a predetermined time is calculated from the second derivative $d^2VSP/dt^2$ of the vehicle speed calculated by the second derivative calculating device 4. In this example, the moving average VSPma" for e.g. about 1 sec. as the predetermined time is calculated.

Subsequently, at step 42, a determination is made whether the opening degree TVO of the throttle valve detected by the sensor 1 is zero (TVO=0) or not, i.e. a driver of the vehicle is stepping on an accelerator pedal of the vehicle or not. When a determination that the opening degree TVO of the throttle valve is not zero, is made at the step 42, the procedure is shifted to step 43, and a value t-brk of a timer in the downhill coasting situation determining device 5 is reset as 0 (i.e. t-brk=0) at the step 43, and a determination that all the conditions for the downhill road coasting situation are realized, is canceled at next step 44, then the procedure ends, which are similar to the steps 27, 28 in the first example.

When a determination that the opening degree TVO of the throttle valve is zero, is made at the step 42, the procedure is shifted to step 45, and a determination is made whether the first derivative dVSP/dt of the vehicle speed calculated by the first derivative calculating device 3 is positive or not, i.e. the vehicle speed VSP is increased or not at the step 45. When a determination that the first derivative dVSP/dt of the vehicle speed is not positive, is made at the step 45, then the procedure ends after carrying out the steps 43, 44. On the other hand, when a determination that the first derivative dVSP/dt of the vehicle speed is positive, is made at the step 45, the procedure is shifted to step 46.

At the step 46, a determination is further made whether an absolute value of the moving average VSPma" calculated at the step 41 is smaller than a predetermined value $\alpha_1$ or not, in which the value $\alpha_1$ has been determined as a value nearly equal to zero (provided that $\alpha_0<\alpha_1$ and $0.5<\alpha_0<1$ m/s$^2$ in this example). When a determination that the absolute value of the moving average VSPma" is equal to or larger than the predetermined value $\alpha_1$, is made at the step 46, the procedure ends after carrying out the steps 43,44. On the other hand, when a determination that the absolute value of the moving average VSPma" is smaller than the predetermined value $\alpha_1$, is made at the step 46, the procedure is shifted to step 47, and a determination is made whether the value t-brk of the timer is zero or not (i.e. the timer has been started or not) at the step 47. When a determination that the timer value t-brk is zero, is made at the step 47, the procedure is shifted to step 48, and at the step 48, the timer is started to keep time, then the procedure ends.

When a determination that the timer value t-brk is not zero, is made at the step 47, the procedure is further shifted from the step 47 to step 49, and a determination is made whether the timer value t-brk is greater than a predetermined value td or not at the step 49, the predetermined value td may be the same as of the first example.

When a determination that the timer value t-brk is not greater than the predetermined value td, is made at the step 49, then the procedure ends. On the other hand, when a determination that the timer value t-brk is greater than the predetermined value td, is made at the step 49, a determination that all the conditions for the downhill road coasting situation in this example are realized, is made at next step 50, and the downhill coasting situation determining device 5 generates a signal indicating that the vehicle is in the downhill road coasting situation, then the procedure ends.

Figure 8A:
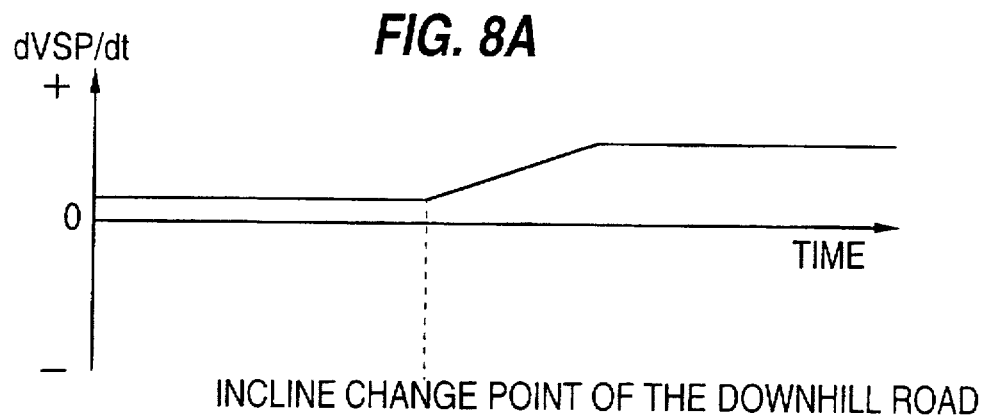
FIG. 8 shows graphs exhibiting examples of transitions of first derivative dVSP/dt of vehicle speed and second derivative $d^2VSP/dt^2$ of vehicle speed, in such a condition that the vehicle is coasting on a downhill road with an incline change.
Figure 8B:
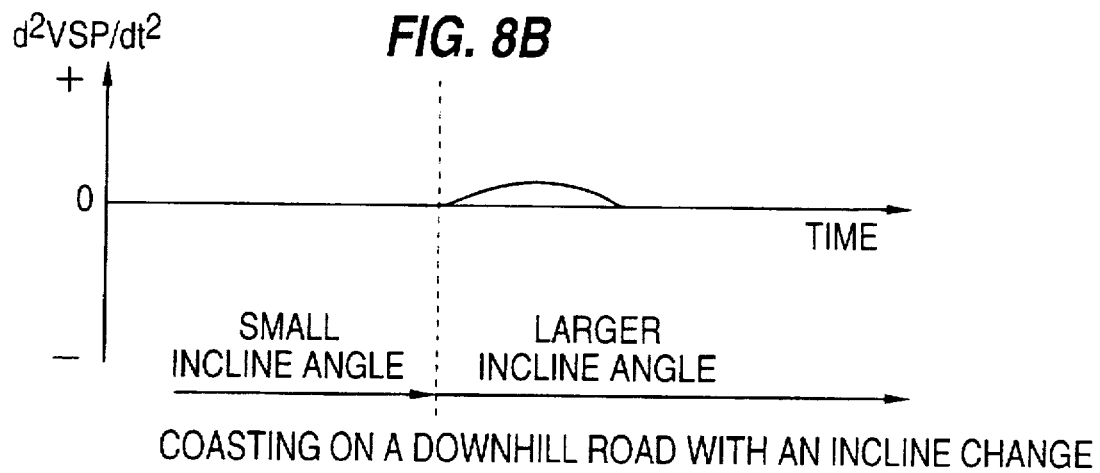

With this second example, a determination whether the vehicle is in the downhill road coasting situation or not, is made based on the opening degree TVO of the throttle valve, the first derivative dVSP/dt of the vehicle speed and the moving average VSPma" of the second derivative $d^2VSP/dt^2$ of the vehicle speed, so that even in a case in which the second derivative $d^2VSP/dt^2$ of the vehicle speed is changed suddenly due to changing of an inclination on the way of the downhill road as shown in FIG. 8 wherein the incline angle becomes larger on the way of the downhill road, the downhill road coasting situation can be detected correctly. That is, with the second example, it can be prevented that the downhill coasting situation determining device 5 incorrectly cancels the signal indicating the downhill road coasting situation due to an influence of the changing part of $d^2VSP/dt^2$ in FIG. 8 despite the vehicle being in the downhill road coasting situation.

The present invention can be applied to several kinds of known or improved control devices for an automotive vehicle, which change a control aim, based on a detection of the downhill road coasting situation. For example, the control device of the automatic transmission of the automotive vehicle described in the aforementioned Japanese patent application laid open No. 64-30959 corresponds to one of such known devices. That is, the control device selects a shift map in accordance with a detection of the downhill coasting situation based on a signal from an incline sensor, to execute a down-shifting so as to increase a braking power of the engine on a downhill road.

FIG. 9 shows a flow-chart of a control routine program for the control device as mentioned above, to execute down-shifting in the downhill road coasting situation. In this program, at step 51, a determination is made whether all the conditions for the downhill road coasting situation are realized or not, and when a determination that all the conditions for the downhill road coasting situation are realized, is made at the step 51, then down-shifting is executed by the control device at step 52, on the other hand, when a determination that all the conditions for the downhill road coasting situation are realized, is not made at the step 51, then a normal gear shifting control is executed by the control device at step 53.

In a first example of a control device for an automotive vehicle as a second preferred embodiment in accordance with the present invention, the determination at the step 51 in the control routine program shown in FIG. 9, is executed by the downhill road coasting situation detecting device of the first or second example of the first preferred embodiment in accordance with the present invention.

With the first example of the control device for an automotive vehicle, appropriate down-shifting can be executed, according to whether the vehicle being coasting on a downhill road or not.

In this case, it is more effective to change a way of down-shifting at the step 52 in accordance with plural down-shifting patterns as e.g. shown in Table 1, based on the present gear position and the first derivative dVSP/dt of the vehicle speed at the time of detecting the downhill road coasting situation.

TABLE 1

|  | dVSP/dt > dVa | dVSP/dt ≦ dVa |
| --- | --- | --- |
| O.D | → O.D-1 → O.D-2 | → O.D-1 |
| O.D-1 | O.D-2 | O.D-1 (hold) |

In the example shown in Table 1 relating to an automatic transmission with four gear positions, when the present gear position is the over-drive position O.D (the 4th gear) and the first derivative dVSP/dt of the vehicle speed is larger than a predetermined value dVa, the gear is shifted down from the over-drive position O.D by one or two positions i.e. shifted down to the 3rd gear (O.D-1) or the 2nd gear (O.D-2), on the other hand, when the present gear position is the over-drive position O.D (the 4th gear) and the first derivative dVSP/dt of the vehicle speed is equal to or smaller than the predetermined value dVa, the gear is shifted down from the over-drive position O.D by only one position i.e. shifted down to only the 3rd gear (O.D-1).

Further, when the present gear position is lower by one position than the over-drive position O.D (O.D-1 i.e the 3rd gear) and the first derivative dVSP/dt of the vehicle speed is larger than the predetermined value dVa, the gear is shifted down from the present gear position O.D-1 (the 3rd gear) to the gear position lower by two position than the overdrive position O.D (O.D-2 i.e. the 2nd gear), on the other hand, when the present gear position is lower by one position than the over-drive position O.D (O.D-1 i.e the 3rd gear) and the first derivative dVSP/dt of the vehicle speed is equal to or smaller than the predetermined value dva, the present gear position (the 3rd gear) is held as it is.

With the application of plural down-shifting patterns mentioned above, more precise control can be executed in accordance with the present gear position and the first derivative dVSP/dt, and when the first derivative dVSP/dt is small at the 3rd gear, up-shifting can be prevented even if the opening degree TVO of the throttle valve is zero (TVO=0).

The present invention can further be applied to a known control device which changes an ignition timing of an ignitor for the engine, based on a detection of the downhill road coasting situation.

Figure 10:
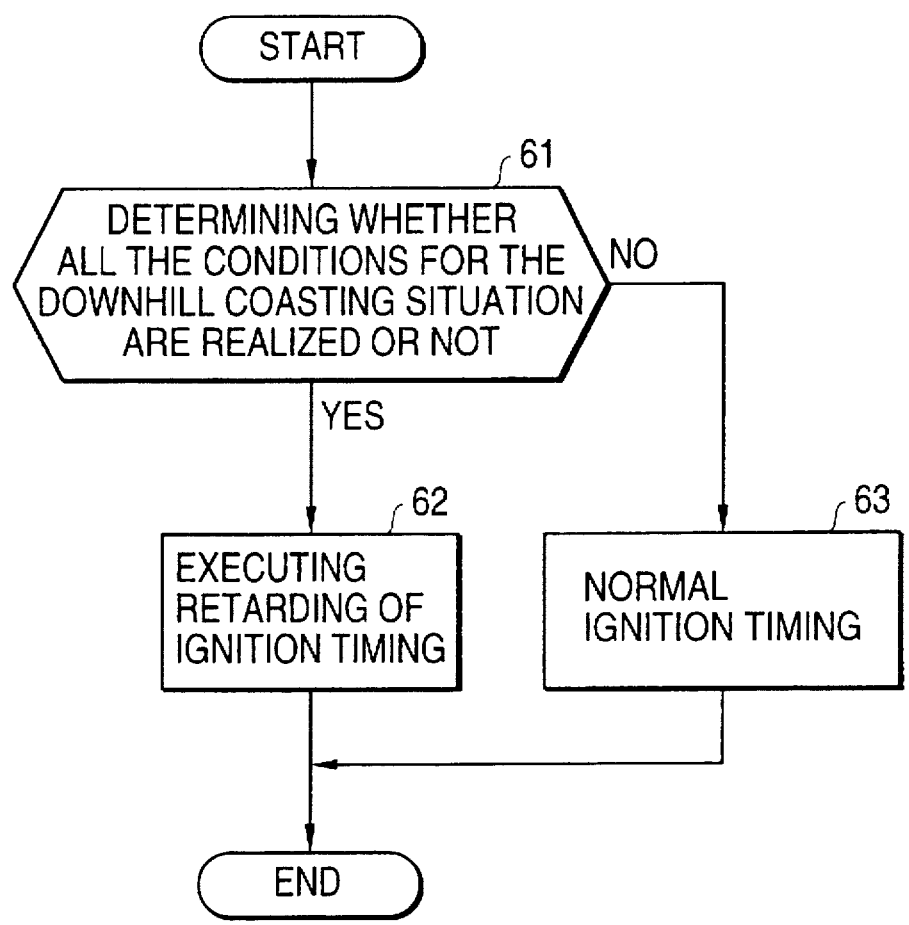
FIG. 10 shows a flow-chart of a control routine program carried out by an example of a control device for an automotive vehicle as a third preferred embodiment in accordance with the present invention.

FIG. 10 shows a flow-chart of a control routine program for the control device as mentioned above, to execute retarding of the ignition timing in the downhill road coasting situation. In this program, at step 61, a determination is made whether all the conditions for the downhill road coasting situation are realized or not, and when a determination that all the conditions for the downhill road coasting situation are realized, is made at the step 61, then retarding of the ignition timing is executed by the control device at step 62, on the other hand, when a determination that all the conditions for the downhill road coasting situation are realized, is not made at the step 61, then igniting with normal timing is executed by the control device at step 63.

In an example of a control device for an automotive vehicle as a third preferred embodiment in accordance with the present invention, the determination at the step 61 in the control routine program shown in FIG. 10, is executed by the downhill road coasting situation detecting device of the first or second example of the first preferred embodiment in accordance with the present invention.

With the above-mentioned example of the control device for an automotive vehicle, igniting of the engine with appropriate timing can be executed, according to whether the vehicle being coasting on a downhill road or not, therefore, the power of engine braking can be enhanced due to restriction of torque generated by the engine.

The present invention can further be applied to a known control device which changes an amount of fuel injecting by a fuel injector for the engine, based on a detection of the downhill road coasting situation.

Figure 11:
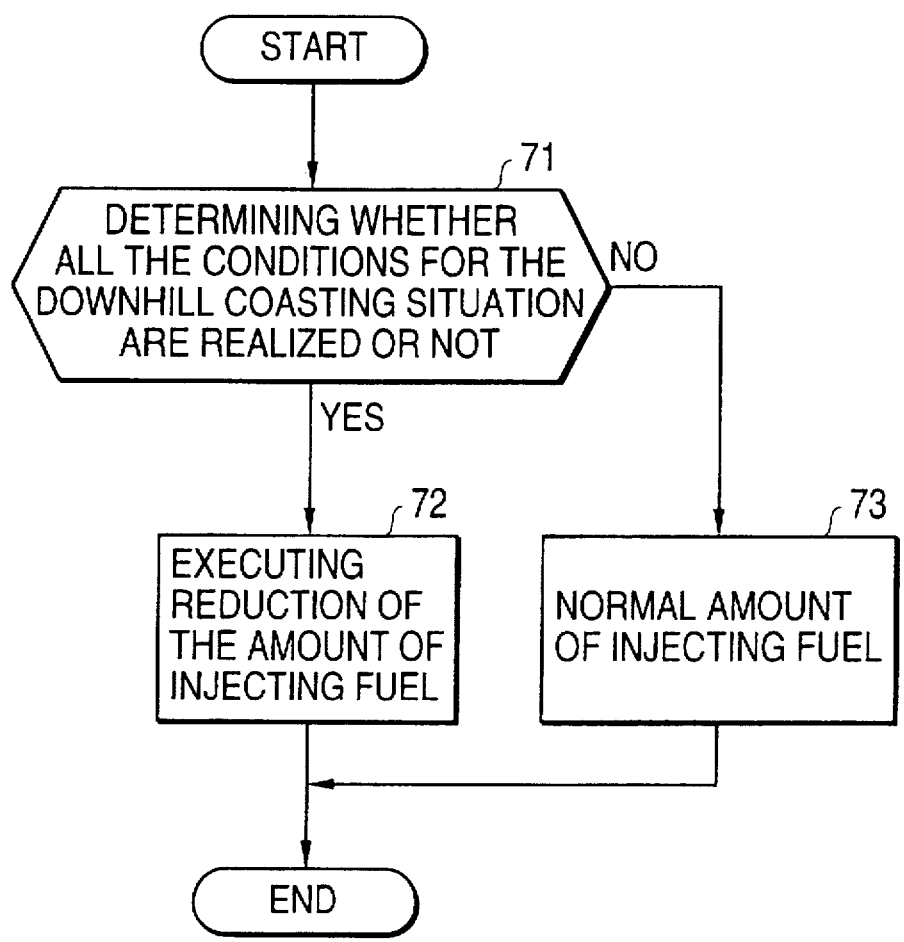
FIG. 11 shows a flow-chart of a control routine program carried out by an example of a control device for an automotive vehicle as a fourth preferred embodiment in accordance with the present invention.

FIG. 11 shows a flow-chart of a control routine program for the control device as mentioned above, to execute reducing of the amount of injected fuel in the downhill road coasting situation. In this program, at step 71, a determination is made whether all the conditions for the downhill road coasting situation are realized or not, and when a determination that all the conditions for the downhill road coasting situation are realized, is made at the step 71, then reducing of the amount of injecting fuel or cutting of the fuel injection is executed by the control device at step 72, on the other hand, when a determination that all the conditions for the downhill road coasting situation are realized, is not made at the step 71, then injecting with normal amount of fuel is executed by the control device at step 73.

In an example of a control device for an automotive vehicle as a fourth preferred embodiment in accordance with the present invention, the determination at the step 71 in the control routine program shown in FIG. 11, is executed by the downhill road coasting situation detecting device of the first or second example of the first preferred embodiment in accordance with the present invention.

With the above-mentioned example of the control device for an automotive vehicle, injecting with appropriate amount of fuel can be executed, according to whether the vehicle being coasting on a downhill road or not, therefore, a fuel consumption ratio of the engine can be enhanced.

Additionally, with reference to a control device for an automotive vehicle as the second embodiment of the present invention, further examples are explained below.

Figure 14:
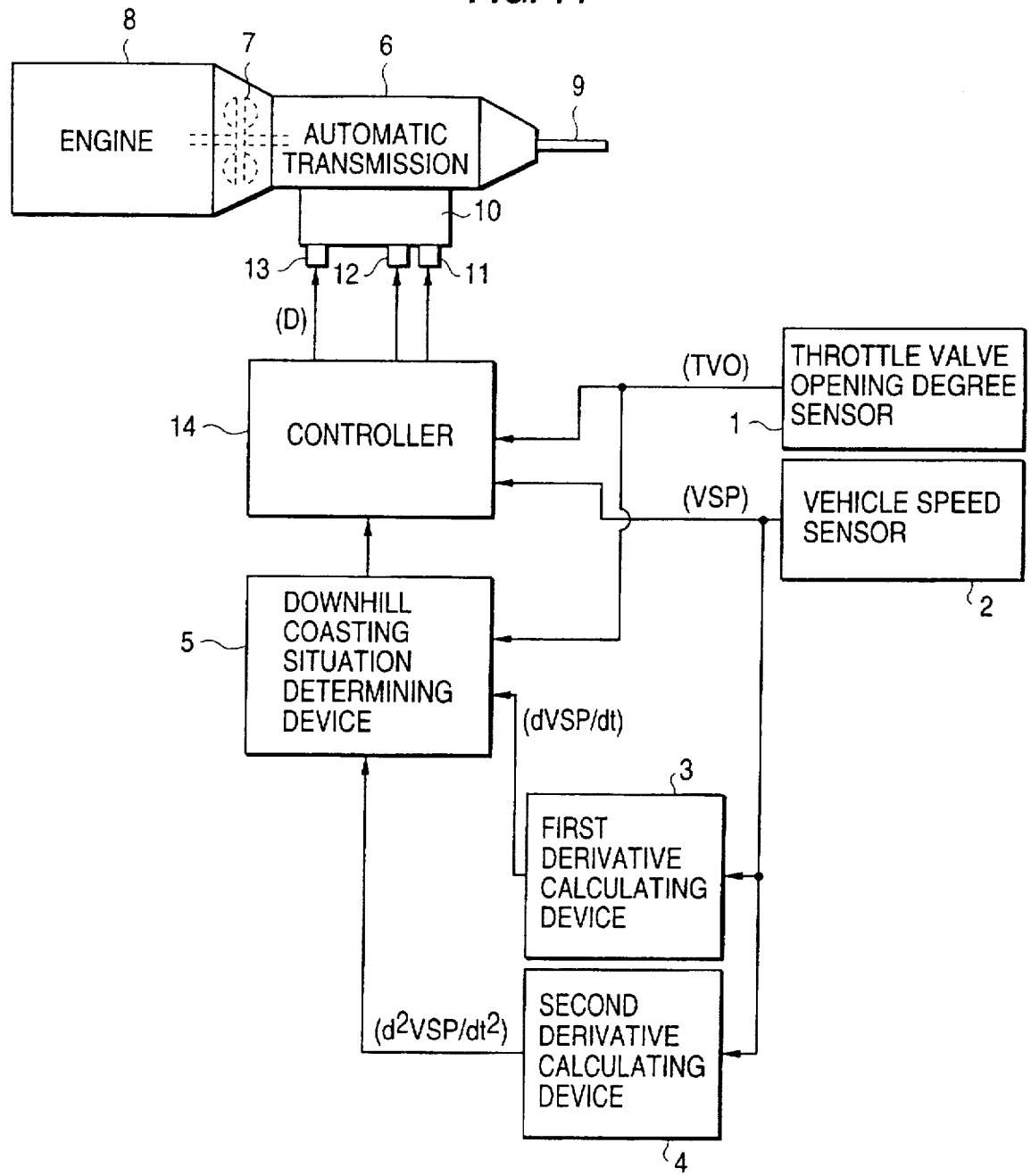
FIG. 14 shows a block diagram of an arrangement of a second example of the control device for an automotive vehicle as the second preferred embodiment in accordance with the present invention.

FIG. 14 shows a second example of a control device for an automotive vehicle as the second preferred embodiment of the present invention. The control device shown in FIG. 14 controls gear shifting of an automatic transmission 6 of the automotive vehicle (not shown). The automatic transmission 6 is of e.g. four gear position type, and supplied with a rotational power from an engine 8 of the automotive vehicle through a torque convertor 7. The automatic transmission 6 changes a speed of the supplied rotation by a gear ratio corresponding to a selected gear position, then transmits the rotation to an output shaft 9 so as to drive the automotive vehicle. Further, the automatic transmission 6 realizes the selected gear position by a combination of ON and OFF of shifting solenoids 11, 12 included in a control valve device 10, while the torque convertor 7 assumes a converting condition in which input and output elements thereof are not directly connected or a locking-up condition in which the input and output elements are directly connected, by duty control of a locking-up solenoid 13 also included in the control valve device 10.

The control device shown in FIG. 14 comprises a controller 14 having shift maps for controlling ON, OFF of the shifting solenoids 11, 12 and an operating duty D of the locking-up solenoid 13, a throttle valve opening degree sensor 1 for detecting an opening degree TVO of a throttle valve for the engine 8 of the automotive vehicle, a vehicle speed sensor 2 for detecting a vehicle speed VSP of the automotive vehicle, a first derivative calculating device 3 for calculating a changing rate dVSP/dt of a vehicle speed of the automotive vehicle i.e. the first derivative of a vehicle speed VSP with respect to time t based on a vehicle speed VSP detected by the vehicle speed sensor 2, and a second derivative calculating device 4 for calculating a changing rate $d^2VSP/dt^2$ of a changing rate of a vehicle speed of the automotive vehicle i.e. the second derivative of a vehicle speed VSP with respect to time t based on a vehicle speed VSP detected by the vehicle speed sensor 2.

The control device shown in FIG. 14 further comprises a downhill coasting situation determining device 5 for determining whether the automotive vehicle being in a downhill coasting situation in which the vehicle being coasting on a downhill road, or not, based on the detected opening degree TVO of the throttle valve, the first derivative dVSP/dt of the vehicle speed and the second derivative $d^2VSP/dt^2$ of the vehicle speed, which are brought from the throttle valve opening degree sensor 1, the first derivative calculating device 3 and the second derivative calculating device 4, and memorized in the device 5. The controller 14 is supplied with the throttle valve opening degree TVO detected by the throttle valve opening degree sensor 1, the vehicle speed VSP detected by the vehicle speed sensor 2 and an information with reference to the downhill coasting situation determined by the downhill coasting situation determining device 5, which relate to down-shifting on a downhill road required by a driver.

In this example, the above-mentioned devices 3, 4, 5 and the controller 14 are composed of digital circuits, and the first derivative calculating device 3 calculates the first derivative from the detected vehicle speed VSP at intervals of a certain time, while the second derivative calculating device 4 calculates the second derivative from the detected vehicle speed VSP at intervals of a certain time. The automatic transmission 6 selects a gear position by means of a hydraulic circuit included in the control valve device 10 which receives gear shifting command signals for the shifting solenoids 11, 12 as mentioned before from the controller 14.

Figure 15:
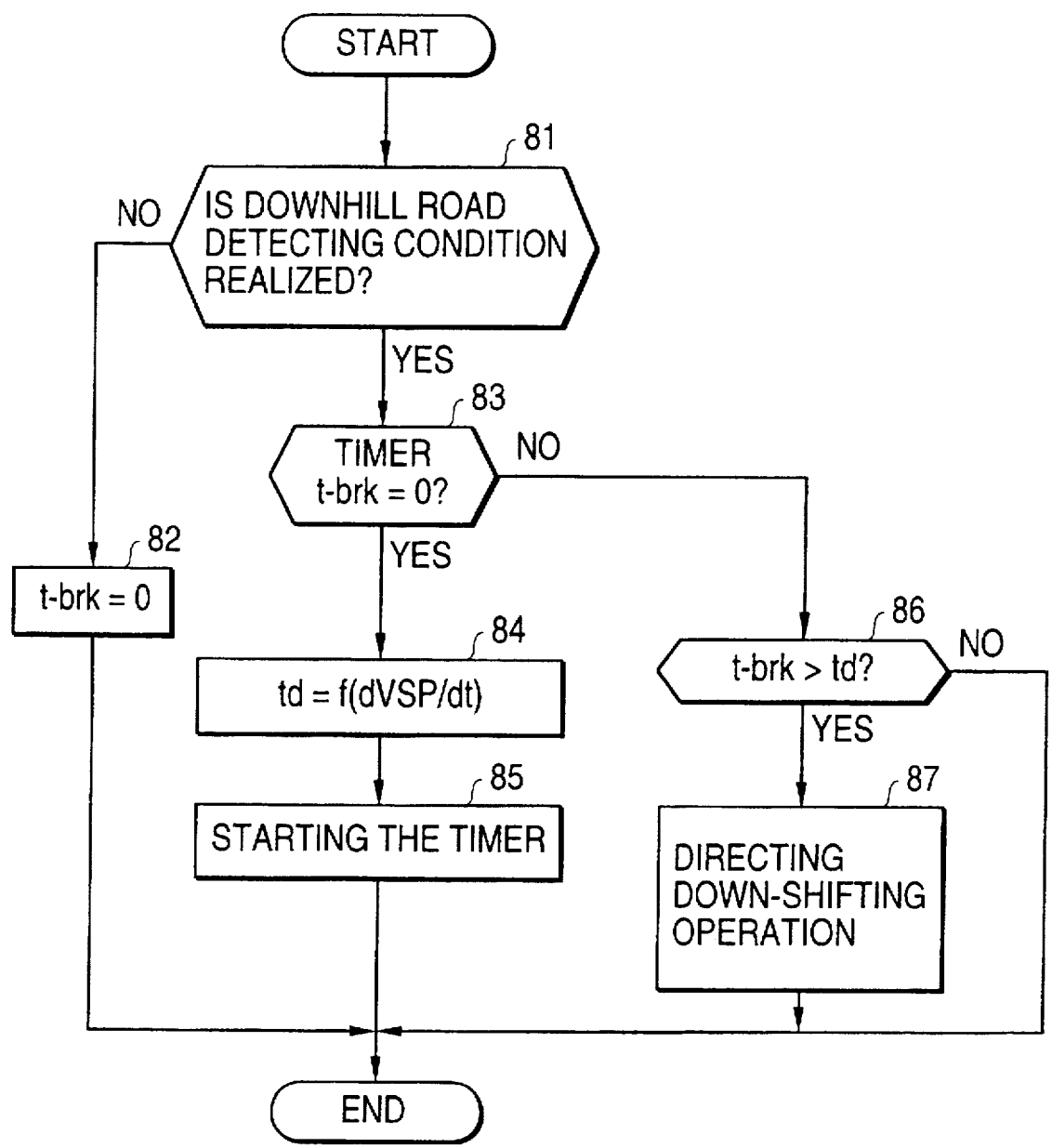
FIG. 15 shows a flow-chart of a control routine program carried out by a downhill coasting situation determining device in the second example shown in FIG. 14.

FIG. 15 shows a flow-chart of a control routine program for the downhill coasting situation determining device 5 in the second example of the control device, to direct down-shifting to the controller 14 in the downhill coasting situation. This control routine program is carried out by the downhill coasting situation determining device 5 repeatedly during running of the vehicle.

In this program, at step 81, a determination is made whether a downhill road detecting condition is realized or not. In this example, an existence of (1);TVO=0, (2);dVSP/dt>0 and (3);$d^2VSP/dt^2$=0 is set as the downhill road detecting condition, that is, at the step 81, a determination is made whether the vehicle speed increases by a certain rate despite the throttle valve being closed, or not, so as to detect the downhill coasting situation, then a further determination is made whether the second derivative of the vehicle speed is zero or not, so as to prevent a detection error due to a remainder of inertia after acceleration of the vehicle.

When a determination that the downhill road detecting condition is not realized, is made at the step 81, the procedure is shifted to step 82, and a value t-brk of a timer for counting a delay from a point of time of an opening degree of the throttle valve being made zero to a point of time of down-shifting in the downhill coasting situation determining device 5, is reset as 0 (i.e. t-brk=0) at the step 82, then the procedure ends.

On the other hand, when a determination that the downhill road detecting condition is realized, is made at the step 81, the control device determines that the vehicle is in the downhill coasting situation, so that the procedure is shifted to step 83, and a further determination is made whether the value t-brk of the timer is zero or not (i.e. the timer has been started or not) at the step 83. When the timer value t-brk is zero at the step 83, the procedure is shifted to step 84, and an aiming delay td from a point of time of an opening degree of the throttle valve being made zero to a point of time of down-shifting is calculated by the following equation (4) at the step 84.

$$td(msec.) = f(dVSP/dt) = 5660/(dVSP/dt) + 4.38 \quad (4)$$

This function f(dVSP/dt) is a fractional function determined based on experimental values of the delay to which a diver felt appropriate for various values of dVSP/dt.

Figure 16:
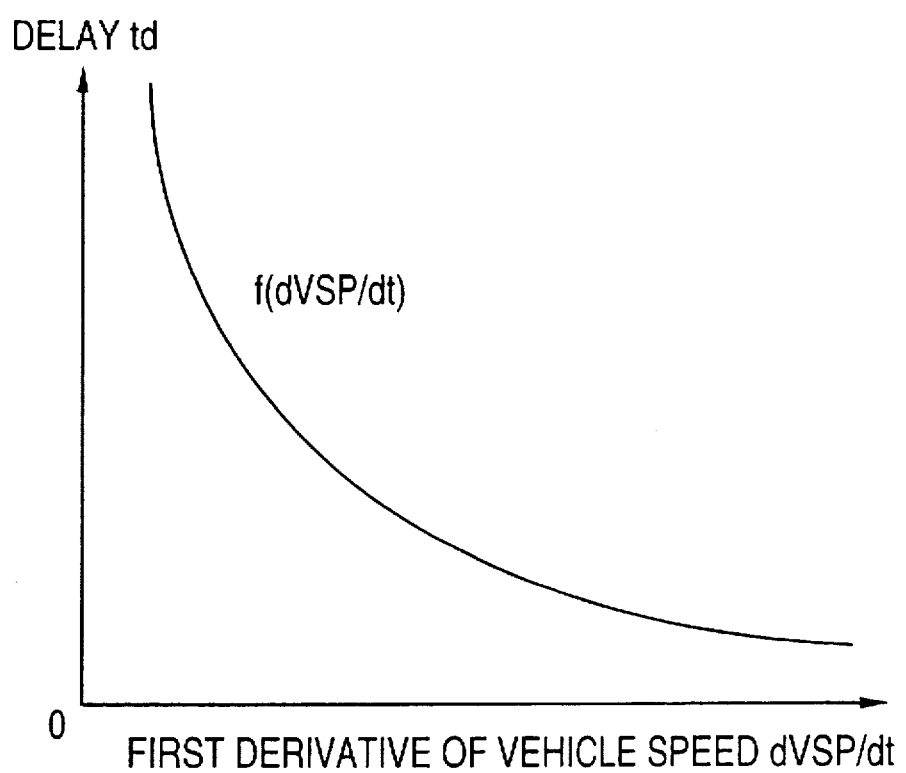
FIG. 16 shows a graph of a characteristic curve exhibiting a relationship between aiming delay td and first derivative dVSP/dt of vehicle speed.

FIG. 16 shows a graph of a characteristic curve exhibiting a relationship between the aiming delay td and the first derivative dVSP/dt of the vehicle speed corresponding to the above-mentioned equation. Since the first derivative dVSP/dt of the vehicle speed increases in accordance with increasing of an incline angle of a downhill road on which the vehicle coasts, the incline angle can be determined based on the first derivative dVSP/dt of the vehicle speed. Therefore, in this example, the aiming delay td is determined from the relationship shown in FIG. 16, so as to hasten down-shifting of the automatic transmission 6 in accordance with increasing of an incline angle of a downhill road. After calculating of the aiming delay td at the step 84, the timer is started to keep time at step 85, then the procedure ends.

When a determination that the timer value t-brk is not zero, is made at the step 83, the procedure is shifted from the step 83 to step 86, and a determination is made whether the timer value t-brk is greater than the calculated aiming delay td or not at the step 86, this comparison of the timer value t-brk with the aiming delay td corresponding to a determination whether the downhill road detecting condition is realized continuously for the aiming delay td or not.

When a determination that the timer value t-brk is not greater than the aiming delay td, is made at the step 86, then the procedure ends. On the other hand, when a determination that the timer value t-brk is greater than the aiming delay td, is made at the step 86, the downhill coasting situation determining device 5 supplies a gear shifting command signal directing down-shifting operation to the controller 14 at next step 87, then the procedure ends.

Figure 17A:
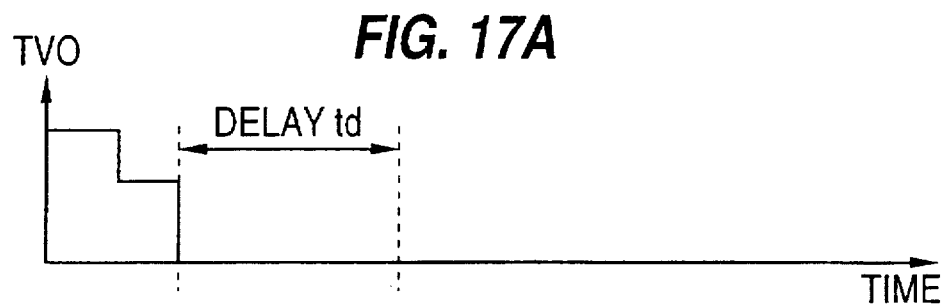
FIG. 17 shows graphs exhibiting examples of transitions of throttle valve opening degree TVO, first derivative dVSP/dt of vehicle speed and second derivative $d^2VSP/dt^2$ of vehicle speed, with reference to a vehicle utilizing the second example shown in FIG. 14.
Figure 17B:
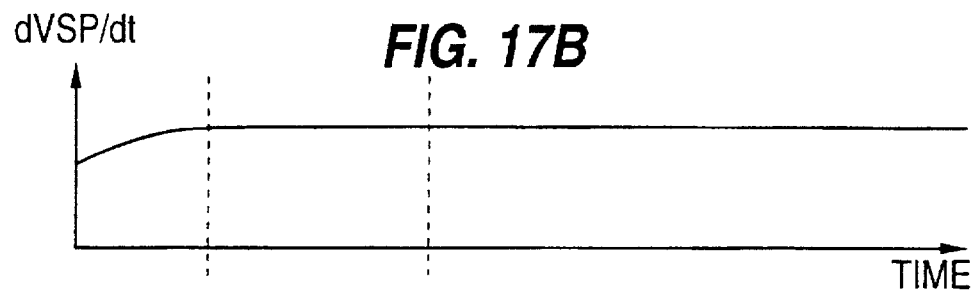
Figure 17C:
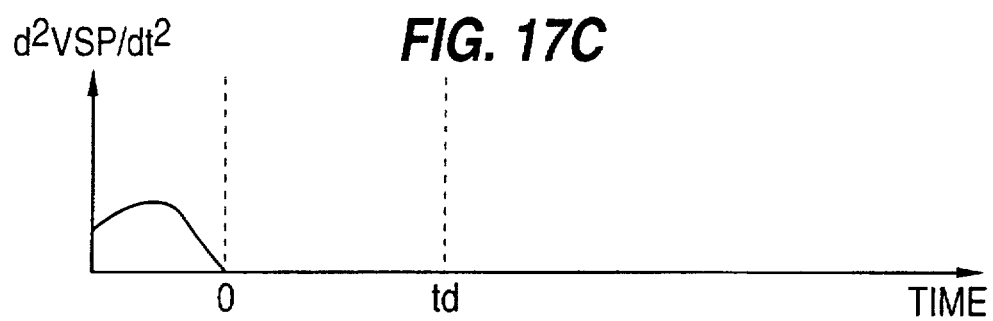

When the gear shifting command signal directing down-shifting operation is supplied to the controller 14, the controller 14 makes the automatic transmission 6 to execute down-shifting only in case of the vehicle speed VSP being below an up-shifting line to the present gear position in the present shift map, so as to prevent a sudden increase of engine output rotation, and besides, after the down-shifting, the controller 14 is inhibited to execute up-shifting, so as to maintain the engine braking power, till a driver of the vehicle steps down the accelerator pedal again. Incidentally, FIG. 17 shows graphs exhibiting examples of transitions of the opening degree TVO of the throttle valve, the first derivative dVSP/dt of the vehicle speed and the second derivative $d^2VSP/dt^2$ of the vehicle speed, with reference to the vehicle utilizing the second example of a control device for an automotive vehicle as the second preferred embodiment of the present invention.

With this second example of the control device, the aiming delay is changed in accordance with an inclination of the downhill road, so that down-shifting can be executed at an appropriate timing in accordance with a requirement of a driver of the vehicle, on downhill roads with various inclinations.

Next, a third example of a control device for an automotive vehicle as the second preferred embodiment in accordance with the present invention is explained. The control device of this example also comprises a throttle valve opening degree sensor 1, a vehicle speed sensor 2, a first derivative calculating device 3, a second derivative calculating device 4, a downhill coasting situation determining device 5, and a controller 14, which are similar to those of the above-mentioned second example, so that the same references are used for corresponding sensors and devices.

Figure 18:
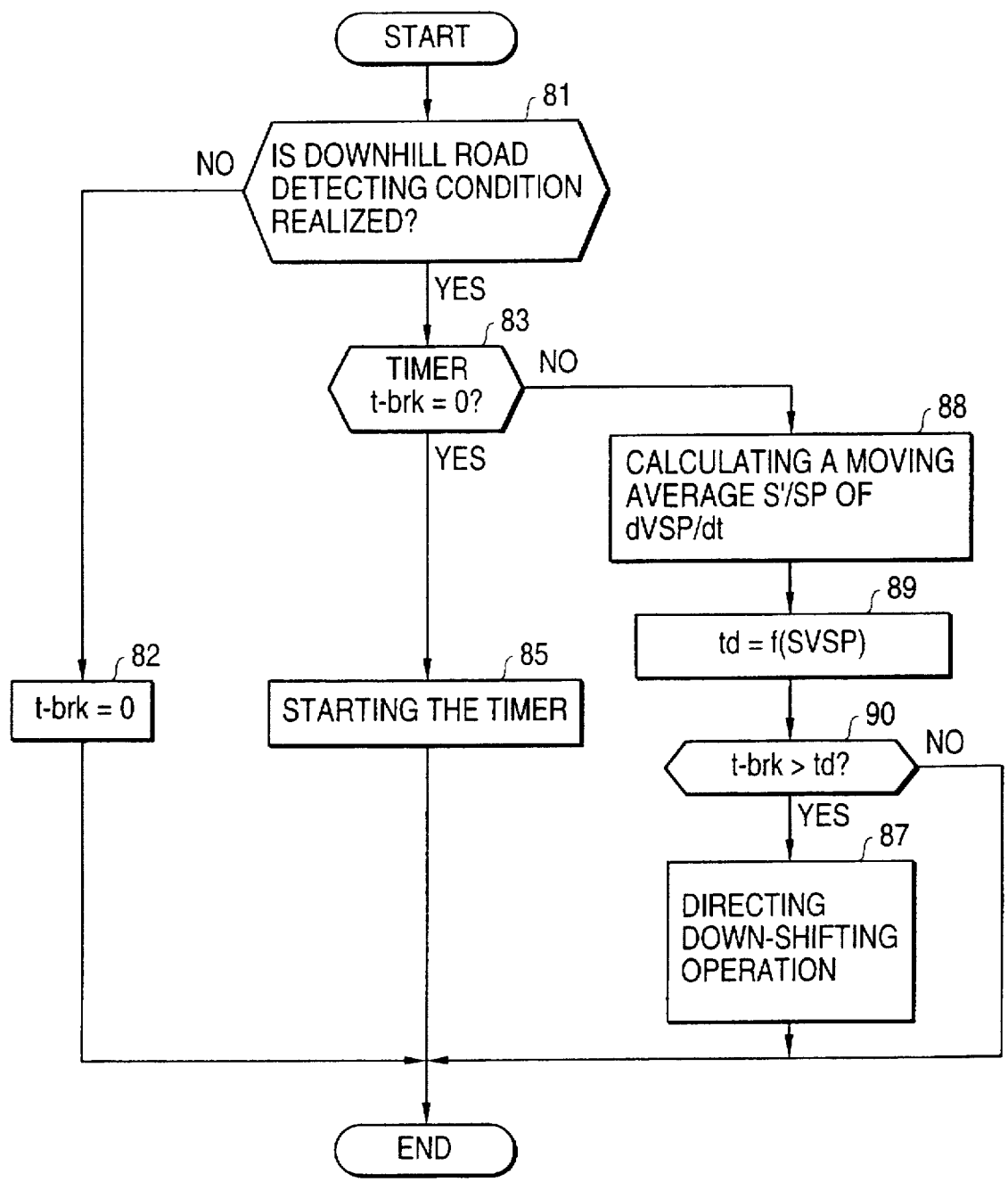
FIG. 18 shows a flow-chart of a control routine program carried out by a downhill coasting situation determining device in a third example of the control device for an automotive vehicle as the second preferred embodiment in accordance with the present invention.

FIG. 18 shows a flow-chart of a control routine program for the downhill coasting situation determining device 5 in the third example of the control device, to direct down-shifting to the controller 14 in the downhill coasting situation. This control routine program is carried out by the downhill coasting situation determining device 5 repeatedly during running of the vehicle. In this example, (3)'; $|d^2VSP/dt^2|<\alpha$ in which $0.5<\alpha<1$ [m/s$^3$], is set in the downhill road detecting condition instead of the aforementioned condition (3); $d^2VSP/dt^2=0$, and besides, a moving average of the first derivative dVSP/dt for about 1 sec. is utilized for calculating the aiming delay td.

That is, in this program, at the step 81, a determination is made whether a downhill road detecting condition is realized or not. In this example, an existence of (1);TVO=0, (2);dVSP/dt>0 and (3)';$|d^2VSP/dt^2|<\alpha$, $0.5<\alpha<1$ (i.e. this $\alpha$ is positive and nearly equal to zero) is set as the downhill road detecting condition.

When a determination that the downhill road detecting condition is not realized, is made at the step 81, the procedure is shifted to the step 82, and a value t-brk of a timer for counting a delay from a point of time of an opening degree of the throttle valve being made zero to a point of time of down-shifting in the downhill coasting situation determining device 5, is reset as 0 (i.e. t-brk=0) at the step 82, then the procedure ends.

On the other hand, when a determination that the downhill road detecting condition is realized, is made at the step 81, the control device determines that the vehicle is in the downhill coasting situation, so that the procedure is shifted to the step 83, and a further determination is made whether the value t-brk of the timer is zero or not (i.e. the timer has been started or not) at the step 83. When the timer value t-brk is zero at the step 83, the procedure is shifted to the step 85, and the timer is started to keep time at the step 85, then the procedure ends.

When a determination that the timer value t-brk is not zero, is made at the step 83, the procedure is shifted from the step 83 to step 88, and the moving average SVSP of the first derivative dVSP/dt for about 1 sec. is calculated at the step 88, then at step 89, the aiming delay td is calculated by the aforementioned equation (4), and at next step 90, a determination is made whether the timer value t-brk is greater than the calculated aiming delay td or not.

When a determination that the timer value t-brk is not greater than the aiming delay td, is made at the step 90, then the procedure ends. On the other hand, when a determination that the timer value t-brk is greater than the aiming delay td, is made at the step 90, i.e. when the downhill road detecting condition is continuously realized during passing of the delay td, the downhill coasting situation determining device 5 supplies a gear shifting command signal directing down-shifting operation to the controller 14 at next step 87, so that the controller 14 makes the automatic transmission 6 to execute down-shifting, then the procedure ends.

With this example, a determination whether the vehicle is in the downhill road coasting situation or not, is made utilizing the moving average SVSP of the the first derivative dVSP/dt of the vehicle speed and calculating the aiming delay from the moving average SVSP till executing of down-shifting, so that even if an inclination of the downhill road changes, the aiming delay to a point of time of down-shifting can be responded to the change of the inclination. Thus, the aiming delay can be calculated more exactly, so that down-shifting can be executed with better correspondence to an intention of a driver of the vehicle.

Next, a fourth example of a control device for an automotive vehicle as the second preferred embodiment in accordance with the present invention is explained. The control device of this example also comprises a throttle valve opening degree sensor 1, a vehicle speed sensor 2, a first derivative calculating device 3, a second derivative calculating device 4, a downhill coasting situation determining device 5, and a controller 14, which are similar to those of the above-mentioned second example, so that the same references are used for corresponding sensors and devices.

Figure 19:
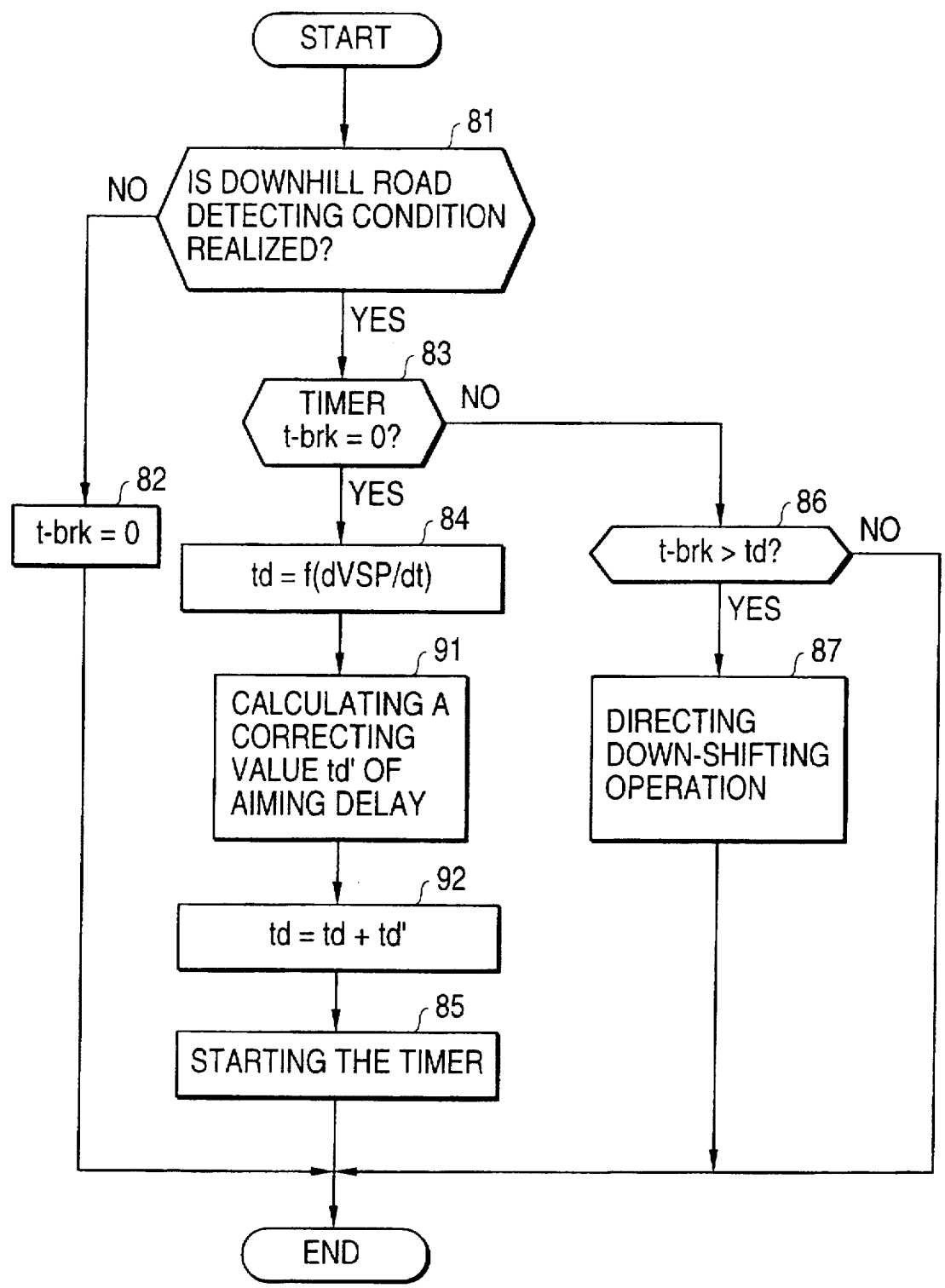
FIG. 19 shows a flow-chart of a control routine program carried out by a downhill coasting situation determining device in a fourth example of the control device for an automotive vehicle as the second preferred embodiment in accordance with the present invention.
Figure 20:
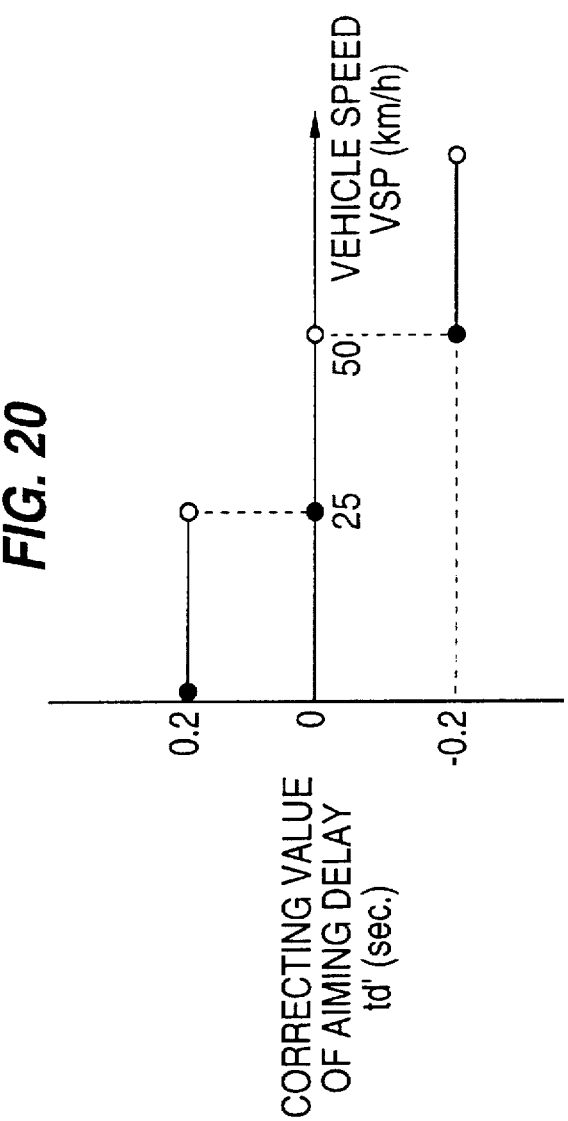
FIG. 20 shows a graph of a step function exhibiting a relationship between correcting value td' and vehicle speed VSP.

FIG. 19 shows a flow-chart of a control routine program for the downhill coasting situation determining device 5 in the fourth example of the control device, to direct down-shifting to the controller 14 in the downhill coasting situation. This control routine program is carried out by the downhill coasting situation determining device 5 repeatedly during running of the vehicle. In this example, after calculating of the aiming delay td at the step 84, a correcting value td' for the aiming delay is determined in accordance with the vehicle speed VSP from a step function shown in FIG. 20 at step 91, and the correcting value td' is added to the calculated aiming delay td at next step 92, however, in case of when sum of td and td' becomes negative, the correcting value td' is not added to the calculated aiming delay td, then the timer is started to keep time at the step 85, and the procedure ends. The rest of the procedure is similar to that in FIG. 15.

With this example, the aiming delay td can be corrected in accordance with the vehicle speed VSP. Thus, the aiming delay can be changed in accordance with the vehicle speed at a beginning of coasting on the downhill road, so that down-shifting can be executed with better correspondence to an intention of a driver of the vehicle.

Incidentally, the above-mentioned steps 91, 92 may be executed in the control program shown in FIG. 18 after the step 89 thereof.

Next, a fifth example of a control device for an automotive vehicle as the second preferred embodiment in accordance with the present invention is explained. The control device of this example also comprises a throttle valve opening degree sensor 1, a vehicle speed sensor 2, a first derivative calculating device 3, a second derivative calculating device 4, a downhill coasting situation determining device 5, and a controller 14, which are similar to those of the above-mentioned second example, so that the same references are used for corresponding sensors and devices.

Figure 21:
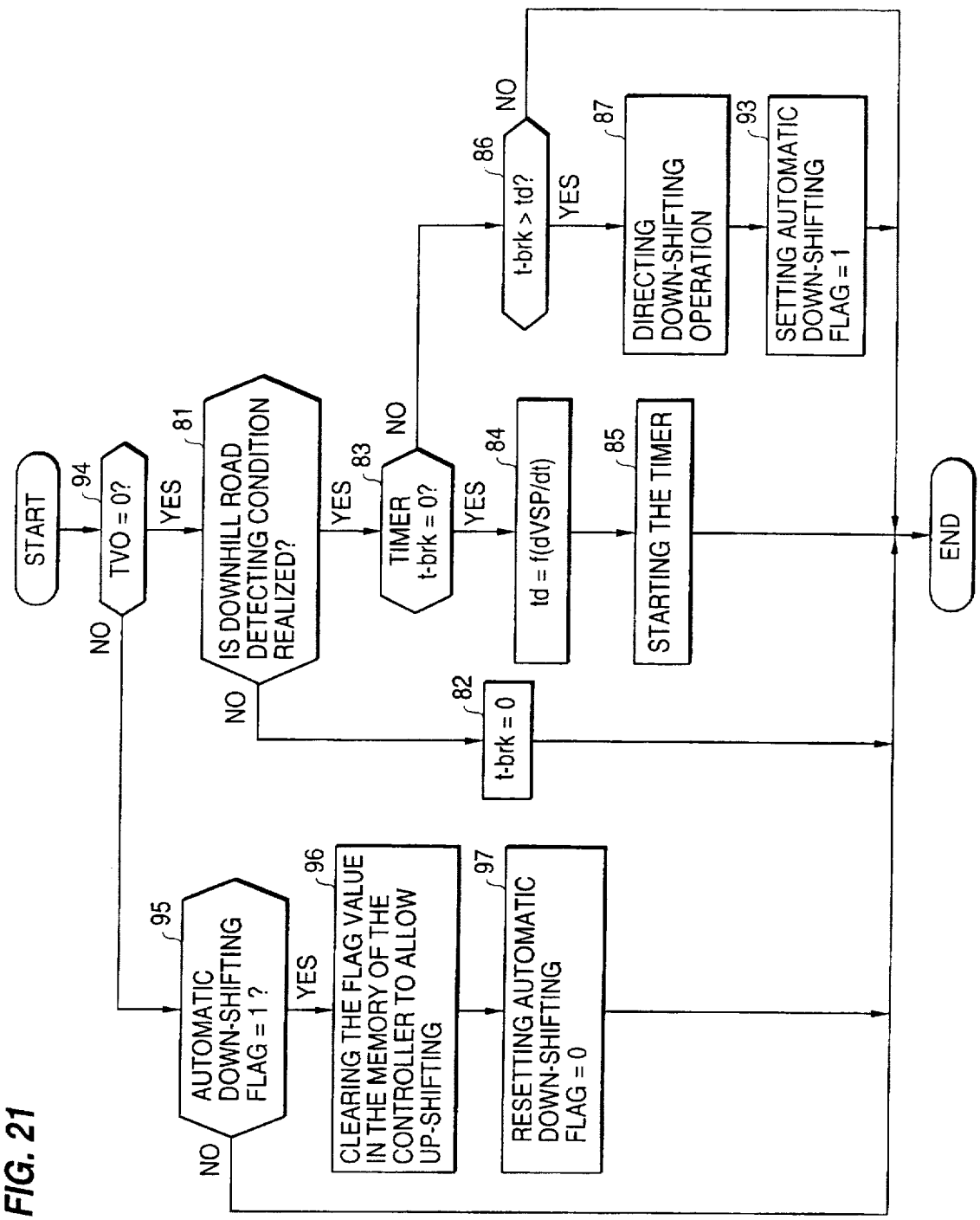
FIG. 21 shows a flow-chart of a control routine program carried out by a downhill coasting situation determining device in a fifth example of the control device for an automotive vehicle as the second preferred embodiment in accordance with the present invention.

FIG. 21 shows a flow-chart of a control routine program for the downhill coasting situation determining device 5 in the fifth example of the control device, to direct down-shifting to the controller 14 in the downhill coasting situation. This control routine program is carried out by the downhill coasting situation determining device 5 repeatedly during running of the vehicle. In this example, when the downhill coasting situation determining device 5 supplies a gear shifting command signal directing down-shifting operation to the controller 14 at the step 87 in FIG. 21, an automatic down-shifting flag is set as 1 and the flag value is memorized in the memory of the controller 14 at next step 93 so as to prevent up-shifting in the downhill coasting situation, then the procedure ends. Further, in the procedure in FIG. 21 in the next time, at step 94, a determination is made whether the opening degree TVO of the throttle valve detected by the sensor 1 is zero or not.

When a determination that the throttle valve opening degree TVO is zero, is made at the step 94, the procedure is shifted to the step 81, on the other hand, when a determination that the throttle valve opening degree TVO is not zero, is made at the step 94, at next step 95 a further determination is made whether the automatic down-shifting flag has been set as 1 or not. When a determination that the automatic down-shifting flag has not been set as 1, is made at the step 95, then the procedure ends, on the other hand, when a determination that the automatic down-shifting flag has been set as 1, is made at the step 95, the procedure is shifted to step 96, and the downhill coasting situation determining device 5 supplies a command signal to the controller 14 to clear the flag value memorized in the memory of the controller 14 at the step 96 so as to allow up-shifting when a driver of the vehicle steps down the accelerator pedal even if the vehicle is in the downhill coasting situation, and the automatic down-shifting flag is reset as 0 at next step 97, then the procedure ends. The rest of the procedure is similar to that in FIG. 15.

With this example, even if the vehicle is in the downhill coasting situation, when a driver of the vehicle steps down the accelerator pedal to accelerate the vehicle, inhibiting of up-shifting is canceled, so that the controller 14 can execute up-shifting.

Figure 22:
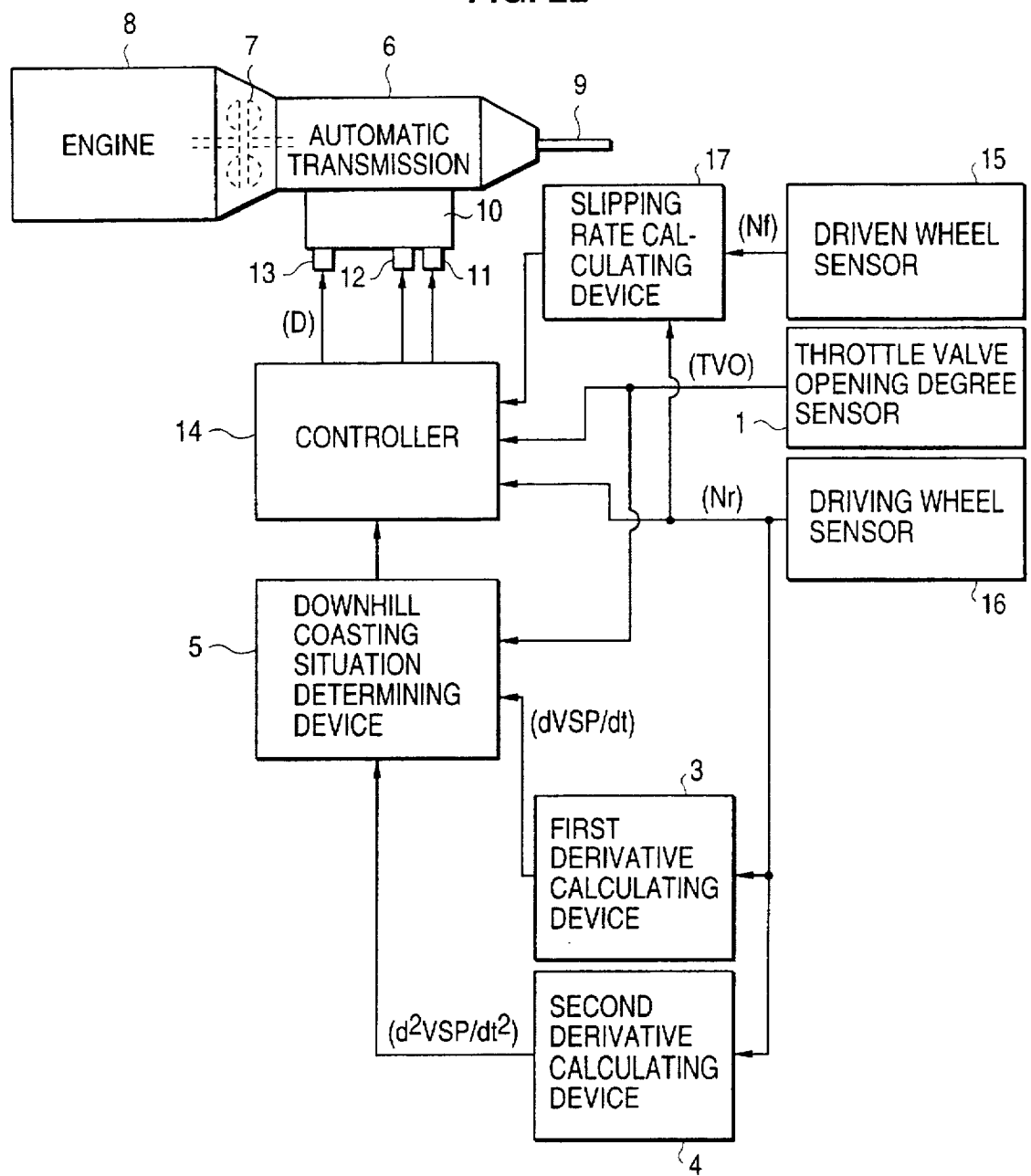
FIG. 22 shows a block diagram of an arrangement of a sixth example of the control device for an automotive vehicle as the second preferred embodiment in accordance with the present invention.

Finally, FIG. 22 shows a sixth example of a control device for an automotive vehicle as the second preferred embodiment in accordance with the present invention. The control device of this example also comprises a throttle valve opening degree sensor 1, a first derivative calculating device 3, a second derivative calculating device 4, a downhill coasting situation determining device 5, and a controller 14, which are similar to those of the above-mentioned second example, so that the same references are used for corresponding sensors and devices.

The control device of this example further comprises a driven wheel sensor 15 for detecting a rotating speed Nf of driven wheels (e.g. front wheels in this example), a driving wheel sensor 16 for detecting a rotating speed Nr of driving wheels (e.g. rear wheels in this example), and a slipping rate calculating device 17 for calculating a slipping rate S of the driving wheels by the following equation (5) from the rotating speed Nf, Nr detected by the sensors 16, 17, so as to determine a frictional resistance of the road on which the vehicle is running. The slipping rate S calculated by the device 17 is supplied to the downhill coasting situation determining device 5 through the controller 14.

$$S=(Nr-Nf)/Nf \tag{5}$$

Figure 23:
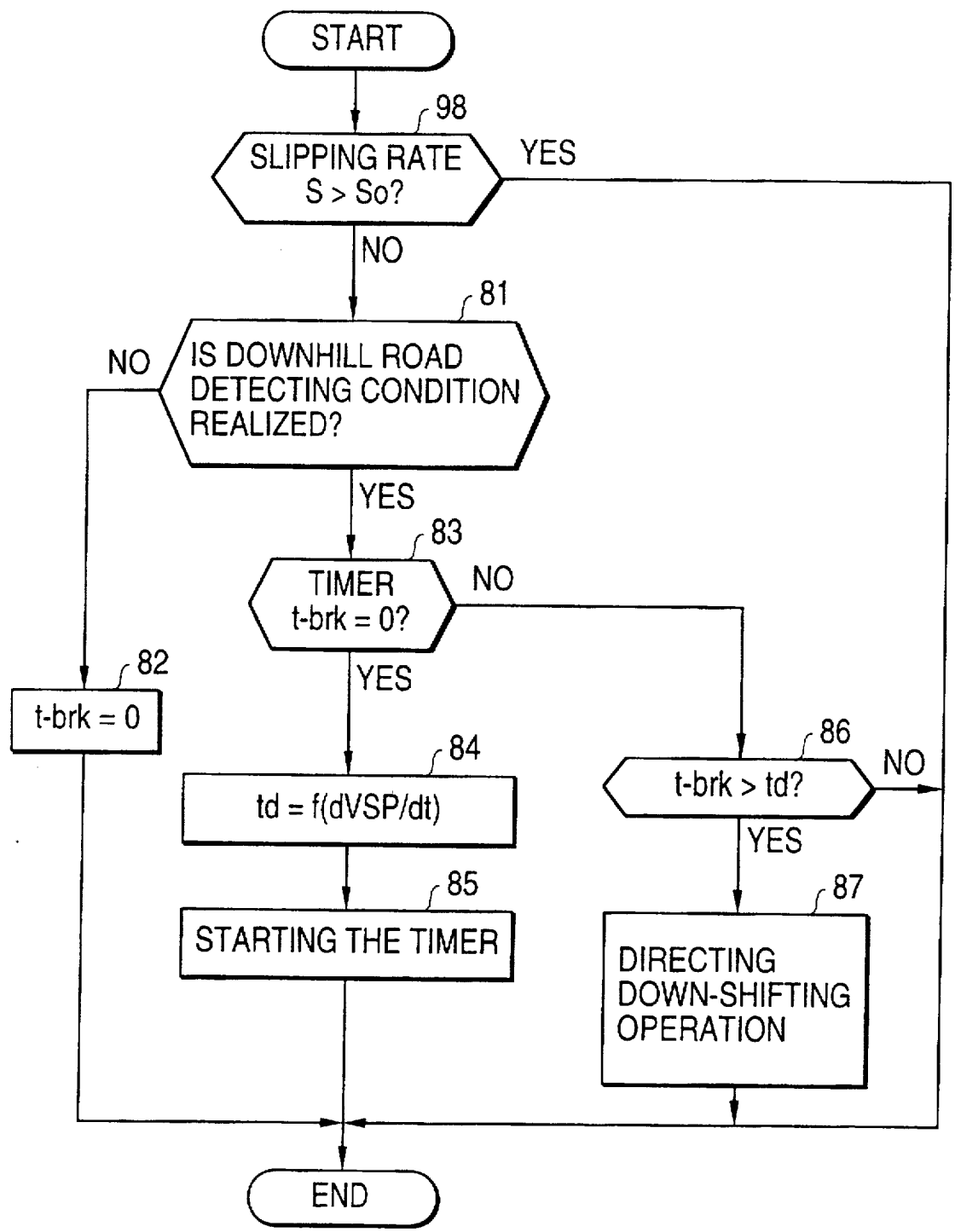
FIG. 23 shows a flow-chart of a control routine program carried out by a downhill coasting situation determining device in the sixth example shown in FIG. 22.

FIG. 23 shows a flow-chart of a control routine program for the downhill coasting situation determining device 5 in the sixth example of the control device, to direct down-shifting to the controller 14 in the downhill coasting situation. This control routine program is carried out by the downhill coasting situation determining device 5 repeatedly during running of the vehicle. In this example, at step 98, a determination is made whether the slipping rate S calculated by the device 17 is greater than a predetermined value $S_0$ or not, and when a determination that the slipping rate S is greater than the predetermined value $S_0$, is made at the step 98, the procedure ends, on the other hand, when a determination that the slipping rate S is not greater than the predetermined value $S_0$, is made at the step 98, the procedure is shifted to the step 81. The rest of the procedure is similar to that in FIG. 15.

With this example, even if the vehicle is in the downhill coasting situation, when the slipping rate S of the road is greater than the predetermined value $S_0$ due to a frictional resistance being lower than a predetermined value, automatic down-shifting for the downhill coasting situation is inhibited, so that spinning of the vehicle caused by down-shifting can be prevented.

Figure 24:
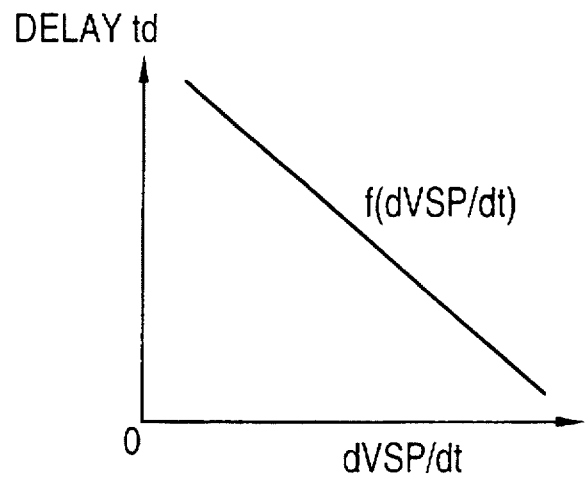
FIG. 24 shows a graph of a monotonically decreasing function exhibiting a relationship between aiming delay td and first derivative dVSP/dt of vehicle speed.
Figure 25:
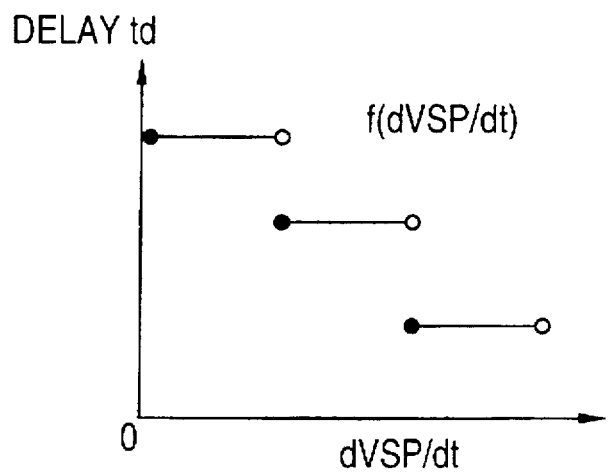
FIG. 25 shows a graph of a step function exhibiting a relationship between aiming delay td and first derivative dVSP/dt of vehicle speed.

It is to be noted that in the aforementioned examples, as the function for calculating the aiming delay td, a monotonically decreasing function as shown in FIG. 24 or a step function as shown in FIG. 25 can be applied.

Further, the controller 14 may be constituted by a micro computer, and at least one among the first derivative calculating device 3, the second derivative calculating device 4, the downhill coasting situation determining device 5 and the slipping rate calculating device 17 may be united in the controller 14.

The foregoing description is by way of example only, and not intended to limit the scope of the appended claims.

We claim:

1. A downhill coasting situation detecting device for an automotive vehicle comprising:

a throttle valve opening degree detecting means for detecting an opening degree of a throttle valve for an engine of said automotive vehicle;

a vehicle speed changing rate calculating means for calculating a changing rate of vehicle speed of said automotive vehicle;

a vehicle speed changing rate changing rate calculating means for calculating a changing rate of changing rate of vehicle speed of said automotive vehicle; and a downhill coasting situation determining means for determining that said automotive vehicle being in a downhill coasting situation in which said vehicle being coasting on a downhill road in accordance with a condition in which said opening degree of said throttle valve is zero, said changing rate of vehicle speed is positive and said changing rate of changing rate of vehicle speed is nearly equal to zero, based on said detected opening degree of said throttle valve, said calculated changing rate of vehicle speed and said calculated changing rate of changing rate of vehicle speed.

2. A downhill coasting situation detecting device for an automotive vehicle according to claim 1; wherein, said downhill coasting situation determining means determines that said automotive vehicle being in a downhill coasting situation in accordance with a condition in which a moving average of said calculated changing rate of changing rate of vehicle speed being nearly equal to zero.

3. A control device for an automotive vehicle comprising a downhill coasting situation detecting device having;

a throttle valve opening degree detecting means for detecting an opening degree of a throttle valve for an engine of said automotive vehicle;

a vehicle speed changing rate calculating means for calculating a changing rate of vehicle speed of said automotive vehicle;

a vehicle speed changing rate changing rate calculating means for calculating a changing rate of changing rate of vehicle speed of said automotive vehicle; and a downhill coasting situation determining means for determining that said automotive vehicle being in a downhill coasting situation in which said vehicle being coasting on a downhill road in accordance with a condition in which said opening degree of said throttle valve is zero, said changing rate of vehicle speed is positive and said changing rate of changing rate of vehicle speed is nearly equal to zero, based on said detected opening degree of said throttle valve, said calculated changing rate of vehicle speed and said calculated changing rate of changing rate of vehicle speed; and said control device further comprising a shift pattern changing means for changing a shift pattern of an automatic transmission of said vehicle based on a detection of the downhill coasting situation by the downhill coasting situation detecting device.

4. A control device for an automotive vehicle comprising a downhill coasting situation detecting device having;

a throttle valve opening degree detecting means for detecting an opening degree of a throttle valve for an engine of said automotive vehicle;

a vehicle speed changing rate calculating means for calculating a changing rate of vehicle speed of said automotive vehicle;

a vehicle speed changing rate changing rate calculating means for calculating a changing rate of changing rate of vehicle speed of said automotive vehicle; and a downhill coasting situation determining means for determining that said automotive vehicle being in a downhill coasting situation in which said vehicle being coasting on a downhill road in accordance with a condition in which said opening degree of said throttle valve is zero, said changing rate of vehicle speed is positive and said changing rate of changing rate of vehicle speed is nearly equal to zero, based on said detected opening degree of said throttle valve, said calculated changing rate of vehicle speed and said calculated changing rate of changing rate of vehicle speed; and said control device further comprising;

a delay calculating means for calculating an aiming delay from a point of time of an opening degree of said throttle valve being made zero to a point of time of down-shifting based on an inclination of a downhill road thereof in case of said downhill coasting situation being detected by said downhill coasting situation detecting device; and a down-shifting directing means for directing an automatic transmission of said vehicle to execute down-shifting, in case of said downhill coasting situation still being detected by said downhill coasting situation detecting device after passing of said calculated aiming delay.

5. A control device for an automotive vehicle according to claim 4 further comprising;

a delay calculation repeating means for directing said delay calculating means to repeat said calculation of said aiming delay responding to changing of an inclination of said downhill road from a point of time of an opening degree of said throttle valve being made zero to a point of time of down-shifting.

6. A control device for an automotive vehicle according to claim 4 further comprising;

a delay correcting means for correcting said aiming delay calculated by said delay calculating means, in accordance with said vehicle speed.

7. A control device for an automotive vehicle according to claim 4 further comprising;

a down-shifted gear position releasing means for releasing an enforcement of said down-shifted gear position caused by said down-shifting directing means, in case of said throttle valve being opened by a driver of said vehicle on said downhill road.

8. A control device for an automotive vehicle according to claim 4 further comprising;

a frictional resistance determining means for determining a frictional resistance of said downhill road; and a down-shifting inhibiting means for inhibiting an execution of down-shifting of said automatic transmission directed by said down-shifting directing means, in case of said determined frictional resistance being lower than a predetermined value.

9. A control device for an automotive vehicle comprising a downhill coasting situation detecting device having;

a throttle valve opening degree detecting means for detecting an opening degree of a throttle valve for an engine of said automotive vehicle;

a vehicle speed changing rate calculating means for calculating a changing rate of vehicle speed of said automotive vehicle;

a vehicle speed changing rate changing rate calculating means for calculating a changing rate of changing rate of vehicle speed of said automotive vehicle; and a downhill coasting situation determining means for determining that said automotive vehicle being in a downhill coasting situation in which said vehicle being coasting on a downhill road in accordance with a condition in which said opening degree of said throttle valve is zeros, said changing rate of vehicle speed is positive and said changing rate of changing rate of vehicle speed is nearly equal to zero, based on said detected opening degree of said throttle valve, said calculated changing rate of vehicle speed and said calculated changing rate of changing rate of vehicle speed; and said control device further comprising an ignition timing changing means for changing an ignition timing of an ignitor for an engine of said vehicle based on a detection of said downhill coasting situation by said downhill coasting situation detecting device.

10. A control device for an automotive vehicle comprising a downhill coasting situation detecting device having;

- a throttle valve opening degree detecting means for detecting an opening degree of a throttle valve for an engine of said automotive vehicle;
- a vehicle speed changing rate calculating means for calculating a changing rate of vehicle speed of said automotive vehicle;
- a vehicle speed changing rate changing rate calculating means for calculating a changing rate of changing rate of vehicle speed of said automotive vehicle; and
- a downhill coasting situation determining means for determining that said automotive vehicle being in a downhill coasting situation in which said vehicle being coasting on a downhill road in accordance with a condition in which said opening degree of said throttle valve is zero, said changing rate of vehicle speed is positive and besides said changing rate of changing rate of vehicle speed is nearly equal to zero, based on said detected opening degree of said throttle valve, said calculated changing rate of vehicle speed and said calculated changing rate of changing rate of vehicle speed; and said control device further comprising a supplying fuel amount changing means for changing an amount of fuel supplied by a fuel supplier for an engine of the vehicle based on a detection of the downhill coasting situation by the downhill coasting situation detecting device.

* * * * *